United States Patent
Kaplan et al.

(10) Patent No.: US 12,101,428 B2
(45) Date of Patent: Sep. 24, 2024

(54) PROXIMITY BASED OPERATING OF A MOBILE COMPUTING DEVICE USING ANOTHER MOBILE COMPUTING DEVICE

(71) Applicants: Max E. Kaplan, Boise, ID (US); Madeline C. Kaplan, Boise, ID (US); Evan F. Paschke, Boise, ID (US)

(72) Inventors: Max E. Kaplan, Boise, ID (US); Madeline C. Kaplan, Boise, ID (US); Evan F. Paschke, Boise, ID (US)

(*) Notice: Subject to any disclaimer, the term of this patent is extended or adjusted under 35 U.S.C. 154(b) by 0 days.

(21) Appl. No.: 18/409,201

(22) Filed: Jan. 10, 2024

(65) Prior Publication Data
US 2024/0187513 A1   Jun. 6, 2024

(51) Int. Cl.
H04M 1/72412   (2021.01)
H04M 1/72454   (2021.01)

(52) U.S. Cl.
CPC ... *H04M 1/72412* (2021.01); *H04M 1/72454* (2021.01)

(58) Field of Classification Search
CPC ........ H04W 4/80; H04W 88/04; H04W 72/40
See application file for complete search history.

(56) References Cited

U.S. PATENT DOCUMENTS

| | | | |
|---|---|---|---|
| 2014/0354852 A1* | 12/2014 | Won | H04N 5/265 348/239 |
| 2015/0093990 A1* | 4/2015 | Lin | H04W 48/20 455/41.2 |
| 2017/0177213 A1* | 6/2017 | Yim | G04G 21/00 |
| 2018/0054249 A1* | 2/2018 | Khanukaev | H04W 8/24 |
| 2018/0239922 A1* | 8/2018 | Furuichi | H04L 63/0492 |
| 2020/0213830 A1* | 7/2020 | Zhao | H04W 76/14 |
| 2022/0030420 A1* | 1/2022 | Wong | H04L 63/0876 |

* cited by examiner

Primary Examiner — Wen W Huang
(74) Attorney, Agent, or Firm — Greenberg Traurig

(57) ABSTRACT

A mobile phone having an application or system module operable to attach the mobile phone to a computing device as a wireless accessory to the computing device over a wireless connection between the mobile phone and the computing device, based at least in part on that the mobile phone is located within a predetermined proximity radius from the computing device, and a display device of the computing device is inactive.

20 Claims, 15 Drawing Sheets

PROXIMITY BASED OPERATING OF A MOBILE COMPUTING DEVICE USING ANOTHER MOBILE COMPUTING DEVICE

TECHNICAL FIELD

At least some embodiments disclosed herein relate to computer user interfaces in general and, more particularly but not limited to, user interactions with mobile phones.

BACKGROUND

Computer networks have enabled remote access of a computer using another computer. For example, during the COVID-19 pandemic, the technology of remote computer access has facilitated work from home by allowing a user to use a home computer to access an office computer over an internet connection.

A keyboard, video, and mouse switch (known as KVM switch) is a hardware component that allow a user to control multiple computers from one or more sets of keyboards, display devices, and computer mice that are wired between the KVM switch and the computers.

Some bluetooth headphones can be paired simultaneously to multiple mobile phones. When one of the mobile phones receives an incoming phone call, such a headphone can connect to the mobile phone being called for a phone conversation. For example, when the headphone is connected to the mobile phone being called, the user may use the headphone to accept or reject the call, control the volume of the mobile phone, or connect to another of the paired mobile phones (e.g., by pressing one or more buttons on the headphone).

BRIEF DESCRIPTION OF THE DRAWINGS

The embodiments are illustrated by way of example and not limitation in the figures of the accompanying drawings in which like references indicate similar elements.

DETAILED DESCRIPTION

In some instances, it is advantageous to operate a mobile phone using another mobile phone, even though both mobile phones are in the vicinity of the user.

For example, the user may carry one mobile phone for business use and another mobile phone for personal use. When an incoming phone call rings one of the mobile phones, the user may pick up one of the phone that is not actually ringing (e.g., due to the proximity of the mobile phones). It can be advantageous for the user to handle the phone call using the mobile phone being picked up, instead of having to pick up the other mobile phone is that is actually ringing.

In at least some embodiments disclosed herein, a mobile phone can be configured to dynamically repurposed as a wireless peripheral input/output device connected to another mobile phone, especially when the mobile phones are in close proximity.

For example, in the above example, when the user picks up the mobile phone that is not actually ring, the user may touch or click an icon on the mobile phone in the hand to cause the mobile phone to operate as a wireless accessory to the mobile phone that is actually ring. The user interactions with the mobile phone in the hand of the user can be transmitted to the mobile phone that is not being picked up; and the screen images (and/or other outputs) of the mobile phone that is not being picked up can be transmitted back to the mobile phone in the hand for presentation. Thus, the user may operate the mobile phone in the hand, as if it were the mobile phone that is not being picked up, as illustrated in FIG. 1.

Figure 1:
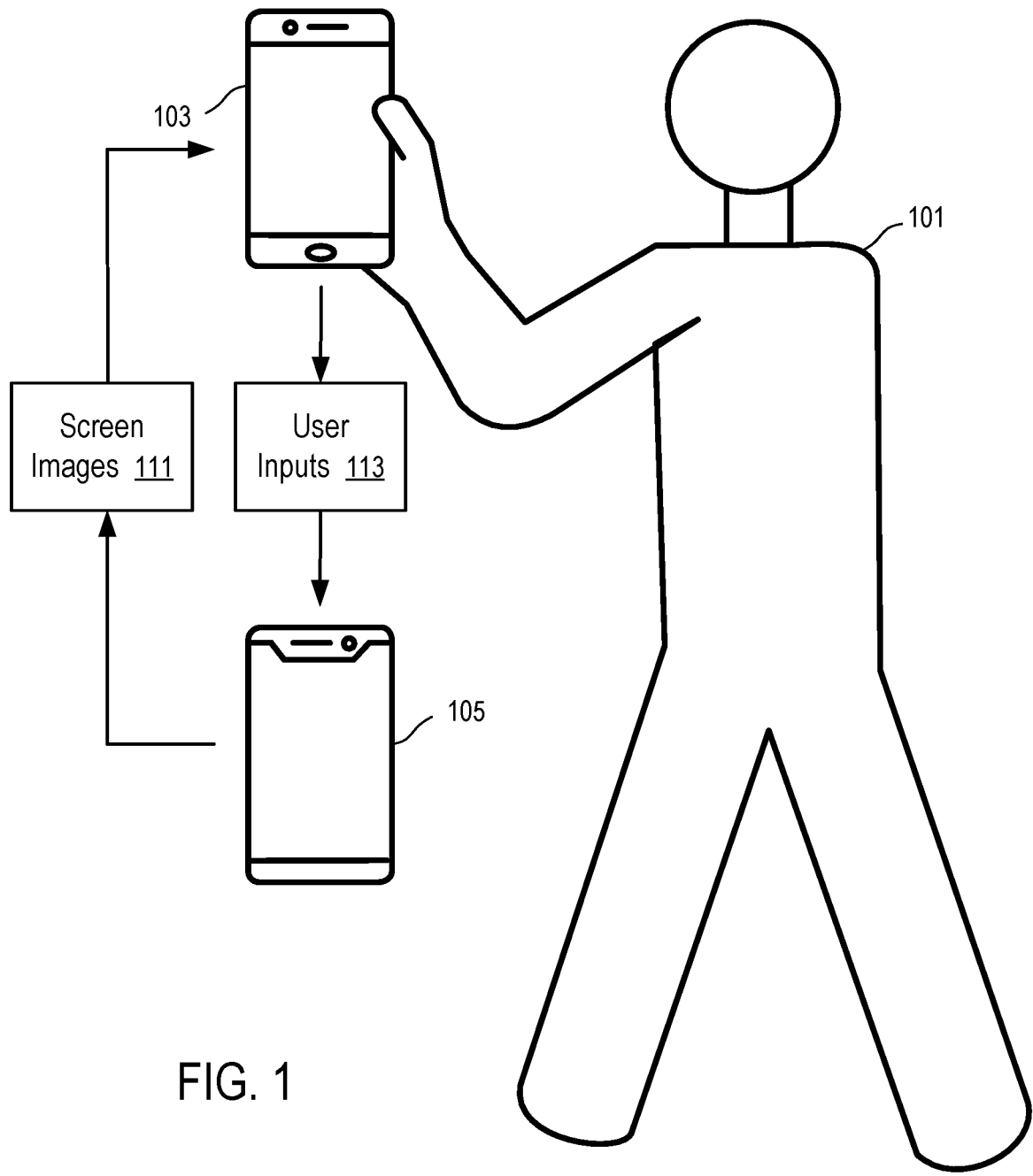
FIG. 1 illustrates proximity based operating of a mobile phone using another mobile phone according to one embodiment.

FIG. 1 illustrates proximity based operating of a mobile phone using another mobile phone according to one embodiment.

In FIG. 1, a user 101 has two mobile phones 103 and 105. The user picks up one mobile phone 103 and determines a need to operate the other mobile phone 105. Instead of switching the phones 103 and 105 for direct interactions, the mobile phones 103 and 105 can be dynamically configured, based at least in part on the physical proximity of the phones, to allow the mobile phone 103 in the hand to function as a wireless accessory to the mobile phone 105. The mobile phone 105 not being picked up can function as a host; and the mobile phone 103 can function as the wireless accessory attached to the host to handle inputs and outputs for the host.

When functioning as a wireless accessory, the accessory mobile phone 103 can transmit user inputs 113 received in the phone 103 to the host mobile phone 105 and receive screen images 111 generated by the host mobile phone 105 for display. Thus, the user 101 can use the mobile phone 103 in the hand to operate the host mobile phone 105.

The accessory-host relation between the mobile phones 103 and 105 can be dynamically determined based at least in part on the proximity of the phones 103 and 105, and based on which of the phones 103 is currently interacting directly with the user 101.

For example, when the mobile phones 103 and 105 determine that the distance between the phone is within a proximity radius, one of the phones 103 and 105 can function as a wireless accessory of the other. However, when the mobile phones 103 and 105 determine that the distance between the phone is greater than the proximity radius, the wireless accessory function/connection can be disable for improved security.

For example, when the phone 103 is unlocked and the phone 105 is locked, the unlocked phone 103 can be a wireless accessory to the locked phone 103. However, when both phones 103 and 105 are unlocked (or locked), the wireless accessory function/connection can be disable, terminated, or disconnected for improved security.

In some implementations, the user may simply unlock the phone 103 to indicate that the user is interacting with the phone 103 in the hand and thus enable the phone 103 to be connected wirelessly to the other phone 105 as a host. For example, the user may unlock the phone 103 via face recognition, finger print recognition, or the use of a pass phase or code.

In some implementations, the user may make a gesture or another input using the phone 103 in the hand to indicate that the user is interacting with the phone 103 in the hand and thus enable the phone 103 to be connected wireless to the other phone 105 as a host. For example, the user may wave the phone 103 to indicate the gesture to request the connection of the phone 103 as a wireless accessory to the phone 105. For example, the user may click or touch or otherwise activate (e.g., via a voice command) a button, icon, command, or user interface element in the phone 103 to request the connection of the phone 103 as an accessory to the other phone 105 in close proximity.

In some implementations, the mobile phones 103 and 105 are configured to automatically determine whether the respective phones are in active, direct interactions with the user 101, e.g., based on the orientations and/or motion patterns of the phones 103 and 105, the valid inputs generated on the touch screens of the mobile phones 103 and 105, power/volume control buttons of the mobile phones 103 and 105, whether the touch screens of the mobile phones are active, etc.

Optionally, the mobile phones 103 and 105 can be configured to estimate the distance between the mobile phones 103 and 105 to determine whether the distance is smaller than a proximity radius. When the distance is smaller than the proximity radius, the wireless accessory function/connection is enabled. Otherwise, the wireless accessory function/connection can be automatically disabled for improved security. In some implementations, the proximity radius is customizable by the user 101 for the mobile phones 103 and 105, as further discussed in connection with FIG. 2.

Figure 2:
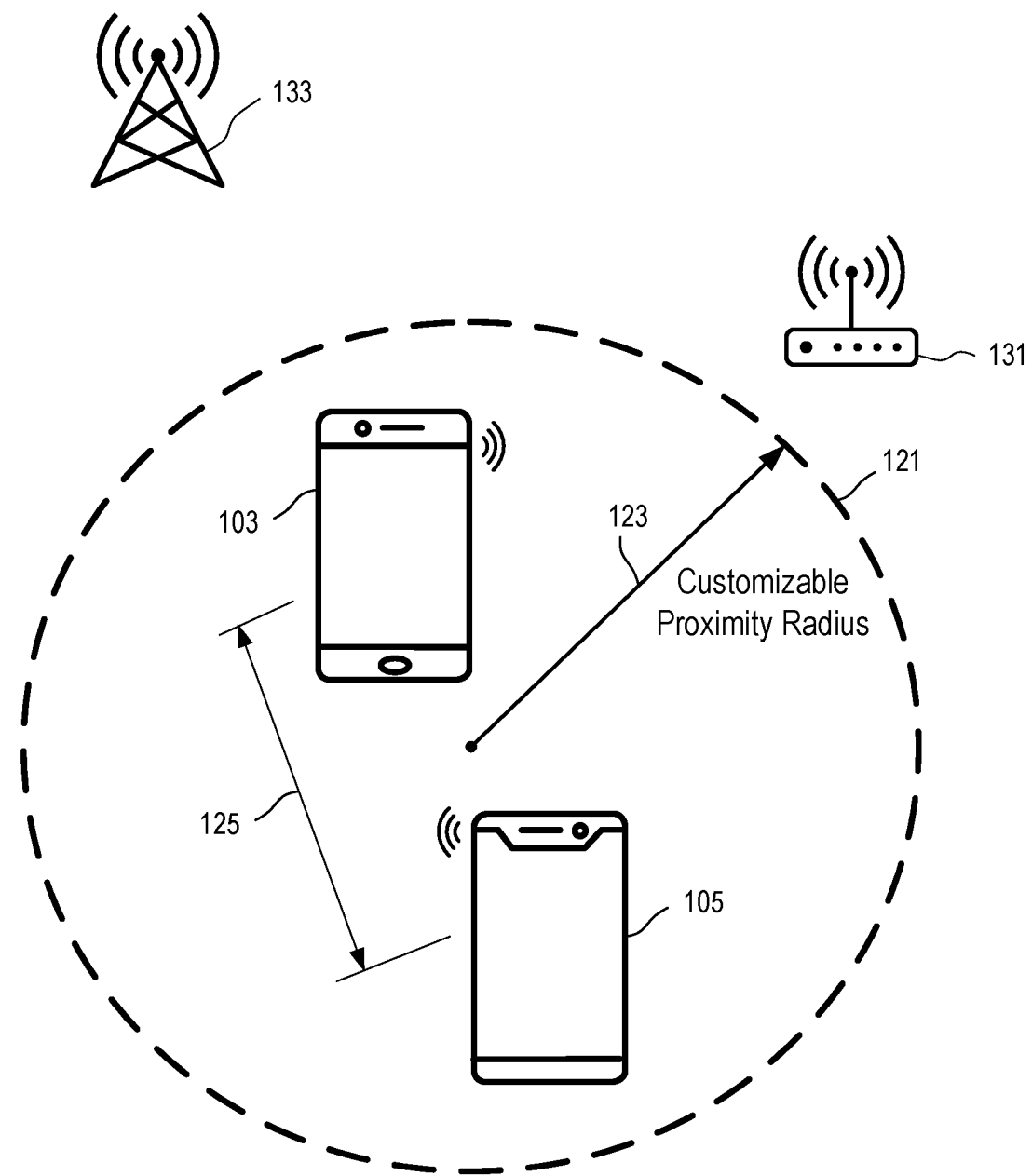
FIG. 2 shows a customizable proximity radius for controlling proximity based operating of a mobile phone using another mobile phone according to one embodiment.

FIG. 2 shows a customizable proximity radius for controlling proximity based operating of a mobile phone using another mobile phone according to one embodiment.

In FIG. 2, mobile phones 103 and 105 (e.g., as used in FIG. 1) can communicate with each other wireless using one or more techniques.

For example, the mobile phones 103 and 105 can communicate with each other via near field communications (NFC). When the mobile phones 103 and 105 are in range for near field communications (NFC), the distance 125 between the mobile phones 103 and 105 is typically no greater than 4 centimeter. Thus, when within a predetermined period of time from a time when the mobile phones 103 and 105 are in range for near field communications (NFC), the mobile phones 103 and 105 can be considered in a region 121 within the proximity radius 123 for the establishment of a wireless connection for a mobile phone (e.g., 103 or 105) to function as an accessory of the other mobile phone (e.g., 105 or 103).

The wireless connection to implement the accessory function can use a different wireless communications technique, such as a technique of wireless personal area network (e.g., bluetooth), a technique of wireless local area network (e.g., wifi), a technique of wide area network (e.g., cellular communications), or a combination of the techniques.

Some of the wireless communications techniques (e.g., bluetooth, wifi) allow the mobile phones 103 and 105 to communicate with each other directly without an intermediary device/system (e.g., an access point, a router, a wired network, a cellular communications system). Other wireless communications techniques (e.g., bluetooth, wifi) can use an intermediary device/system, such as an access point 131, a cellular communications basestation 133, and/or a wired connection.

When the wireless communications between the mobile phones 103 and 105 is performed without an intermediary device/system, each of the mobile phones 103 and 105 can be configured to evaluate the strength levels of wireless communications signals from the other phone. Based on the strength levels, the distance 125 between the mobile phones 103 and 105 for comparison with the proximity radius 123 specified to control the wireless accessory function/connection.

In some implementations, the user 101 can specify the customizable proximity radius by moving the mobile phones 103 and 105 around within a region that is considered by the user 101 to be within the customizable proximity radius 123. During this period of movements, the mobile phones 103 and 105 can measure the strength levels of the wireless signals from each other to identify a signal strength characteristic, profile, or threshold to represent the proximity radius 123 customized for the mobile phones 103 and 105. Subsequently, enabling or disabling the wireless accessory function/connection can be based on the proximity radius 123 customized for the mobile phones 103 and 105.

Optionally, the user 101 may choose to allow the wireless accessory function/connection even when the distance 125 between the mobile phones 103 and 105 is great for direct wireless communications (e.g., via bluetooth or wifi). For example, the mobile phones 103 and 105 can communicate with each other via one or more cellular communications basestations (e.g., 133) and/or one or more wifi access points (e.g., 131). In such a situation, the distance 125 between the mobile phones can be large enough to allow a position determination system to determine, with reasonable accuracy, the positions of the mobile phones 103 and 105 to calculate the distance 125 between the phones 103 and 105. For example, the positions of the mobile phones 103 and 105 can be determined based on a cellular-communications based position determination system, a satellite-based position determination system (e.g., global position system (GPS)), etc.

The wireless accessory function provided by a mobile phone (e.g., 103) to another mobile (e.g., 105) can be implemented via an application or system module running in the mobile phones 103 and 105.

Figure 3:
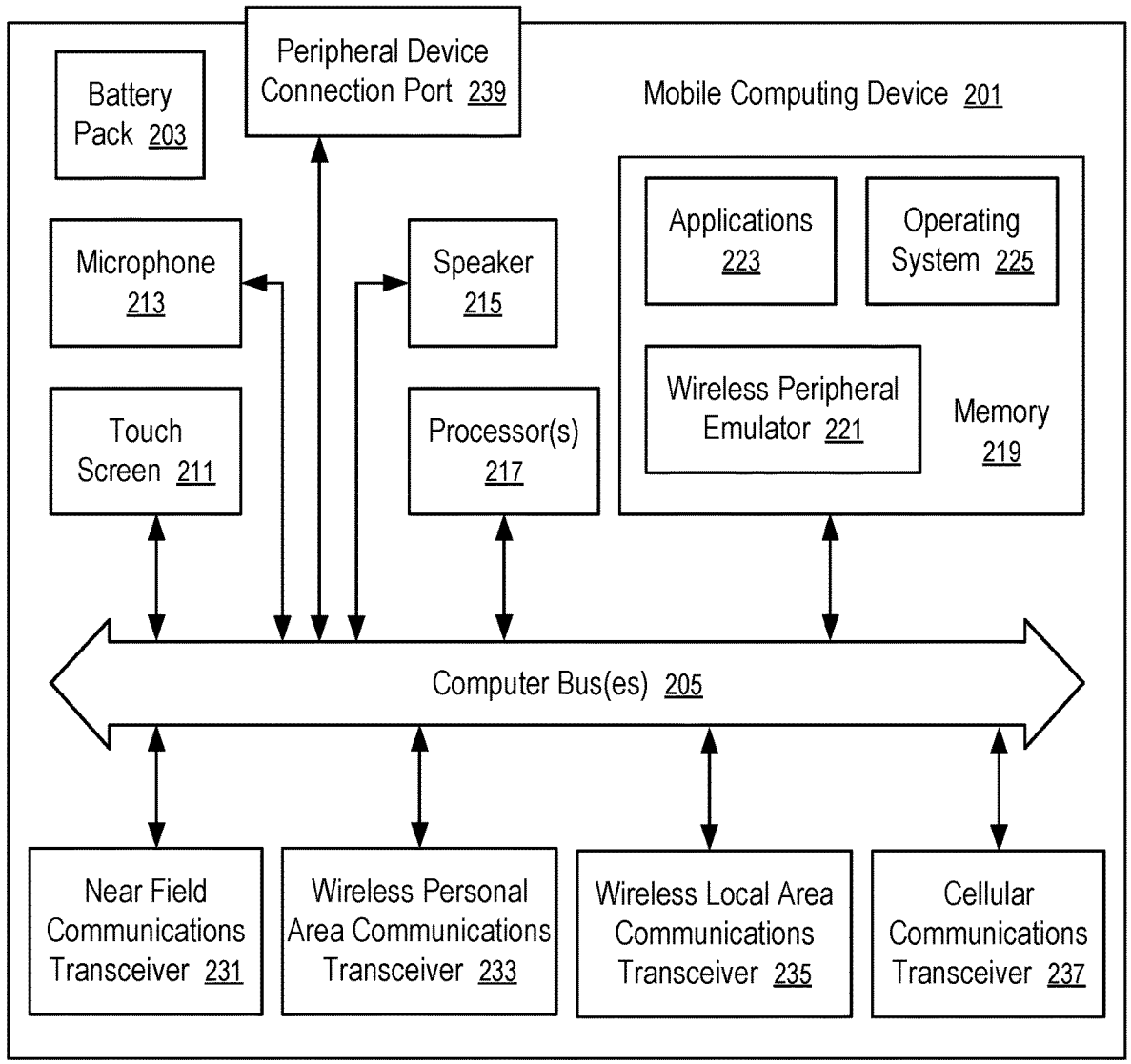
FIG. 3 shows the structure of a mobile computing device usable in proximity based operations according to one embodiment.

FIG. 3 shows the structure of a mobile computing device usable in proximity based operations according to one embodiment. For example, the mobile phones 103 and/or 105 of FIG. 1 and/or FIG. 2 can be implemented using a mobile computing device 201 having a structure of FIG. 3. Optionally, some of the components (e.g., one or more of the transceivers) shown in FIG. 3 can be omitted. In other implementations, additional components (e.g., an accelerometer, a digital camera, a GPS receiver, a touch pad, a keyboard) can be added.

In FIG. 3, the mobile computing device 201 has one or more computer buses 205 connecting one or more processors 217 (e.g., microprocessors, system on a chip (SoC)), memory 219 (e.g., random access memory, flash memory), a touch screen 211, a microphone 123, a speaker 215, a battery pack 203, a peripheral device connection port 239 (e.g., a universal serial bus (USB) port, a lightning port), and a plurality of transceivers (e.g., 231, 233, 235, 237) for wireless communications.

The processors 217 can run an operating system 225 to provide services to the applications 223 running on top of the operating system 225, such as a phone application, a text message application, a music application, a web browser, a social networking application, a voice-based assist application, etc.

The battery pack 203 allows the mobile computing device 201 to function without being tethered to a power cable.

The microphone 213 can be used in a phone application to capture voice inputs in phone conversation, in the voice-based assist application to capture a voice command.

The speaker 215 can be used in a music application to provide audio output, to provide audio alerts, to provide voice response in the voice-based assist application, and to facilitate phone conversation in the phone application.

The touch screen 211 can present visual information generated by the operating system 225 and the applications, to present graphical user interfaces, and to receive user inputs via touching.

The transceivers 231, 233, 235, 237 can be used in wireless communications performed using various techniques, such as near field communications (NFC), wireless personal area network (e.g., bluetooth), wireless local area network (e.g., wifi), wide area network (e.g., cellular communications), etc.

The mobile computing device 201 is operational without accessories. However, one or more accessories can be connected to the mobile computing device 201. For example, a keyboard or computer mouse can be connected to the mobile computing device 201 (e.g., via the peripheral device connection port 239, or the wireless personal area communications transceiver 233). For example, a USB accessory can be connected between the peripheral device connection port 239 and an external display device, a keyboard, and a computer mouse to allow the images generated for the touch screen 211 to show on the display device, and to receive keyboard and cursor control inputs via the keyboard and the computer mouse. For example, a wireless headphone or earphone can be connected wirelessly via the wireless personal area communications transceiver 233 (e.g., bluetooth) to substitute the functions of the microphone 213 and the speaker 215.

To enable the wireless accessory function discussed in connection with FIG. 1 and FIG. 2, the mobile computing device 201 can be configured with a wireless peripheral emulator 221.

The wireless peripheral emulator 221 can be implemented as a system module (e.g., part of the operating system 225), or a third party application running on top of the operating system 225.

When the wireless peripheral emulator 221 is in operation, the mobile computing device 201 is configured as an accessory of a host (e.g., mobile 105 in the example of FIG. 1). As an accessory, the emulator 221 uses the hardware of the mobile computing device 201 (and accessories connected to the mobile computing device 201) to function as an external input/output device of the host.

For example, the touch screen 211 can be used by the wireless peripheral emulator 221 to present screen images generated by the host.

Optionally, the emulator 221 is configured to use one or more of the transceivers (e.g., 231, 233, 235, 237) to receive video signals (e.g., according to a video signal standard for a display device).

Optionally, the emulator 221 is configured to receive, from the host, instructions to generate the screen images, in a way similar to applications (e.g., 223) using application programming interfaces (API) of an operating system (e.g., 225) to generate screen images. For example, when the mobile computing device 201 and the host run the same operating system 225 (or compatible operations systems), the calls to the operating system 225 to generate or modify screen displays can be sent from the host, via one or more of the transceivers (e.g., 231, 233, 235, and/or 237) to the emulator 221. The emulator 221 can then call the operating system 225 to generate the display on the touch screen 211 (or an external display device connected to the port 239).

Similarly, audio outputs from the host can be played back in the speaker 215 (or a wireless headphone or earphone connected to the wireless personal area communications transceiver 233).

For example, voice inputs received in the microphone (or a wireless headphone or earphone connected to the wireless personal area communications transceiver 233) can be sent by the emulator 221 to the host, as if the mobile computing device 201 were a wireless microphone being connected to the host.

Optionally, the audio input functions, the audio output functions, the display functions, etc., provided by the mobile computing device 201 as an accessory to a host can be selective enable and provided based on the context of the emulator 221 and/or the demand of the host.

For example, the emulator 221 can implement a set of virtual accessory devices that can be selectively deployed and/or enabled, as further discussed below in connection with FIG. 4.

Figure 4:
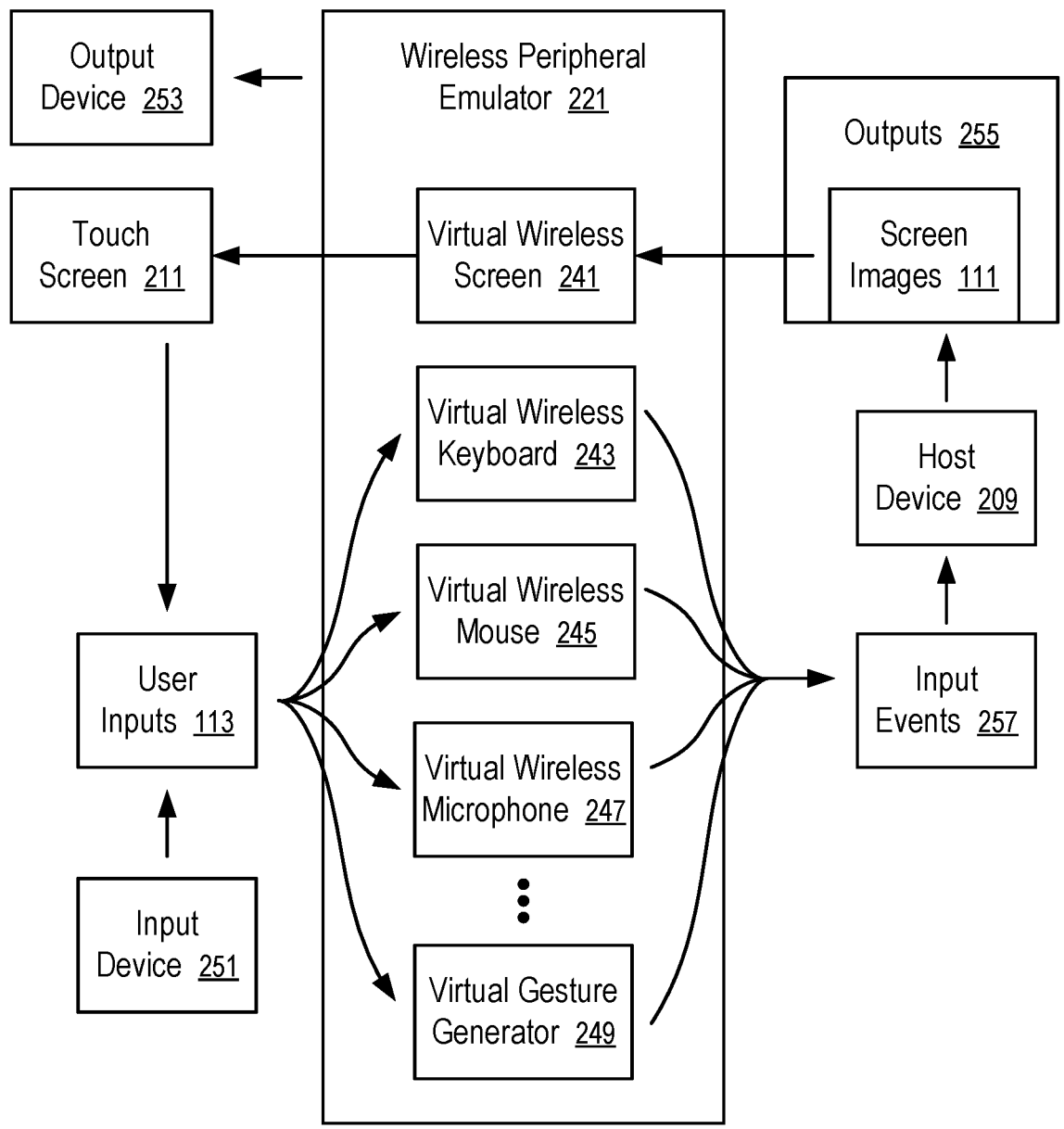
FIG. 4 shows the processing of inputs and outputs during proximity based operating of a mobile computing device using another mobile computing device according to one embodiment.

FIG. 4 shows the processing of inputs and outputs during proximity based operating of a mobile computing device using another mobile computing device according to one embodiment.

For example, an emulator 221 in FIG. 4 can be implemented via an application or a module of the operating system 225 running in the memory 219 of the mobile computing device 201 of FIG. 3.

The emulator 221 can implement a plurality of virtual wireless devices using the hardware available in the mobile computing device (e.g., 201 in FIG. 3).

For example, the virtual wireless devices can include a virtual wireless screen 241, a virtual wireless keyboard 243, a virtual wireless mouse 245 (or cursor control device), a virtual wireless microphone 247, a virtual gesture generator 249, etc. Each of the virtual wireless devices can be used by a host device 209 (e.g., mobile phone 105 in the example of FIG. 1) to process a predefined type of inputs or outputs.

For example, the virtual wireless screen 241 can be a display device that can receive screen images 111 from the host device 209 according to a predefined protocol, such as a standard video protocol for display devices, monitors, or television sets, or a standard for video streaming. The emulator 221 can use the touch screen 211 (or another display device connected to the mobile computing device 201 in which the emulator 221 is running) to show the screen images or video stream received in the virtual wireless screen 241 from the host.

For example, the audio signals in the outputs 255 received from the host device 209 can be captured by a virtual wireless speaker implemented by the emulator 221 and presented by the emulator 221 to an output device 253, such as the speaker 215 (or another audio device) of the mobile computing device 201 in which the emulator 221 is running.

When the user 101 interacts with the touch screen 211 and/or other input devices 251 (e.g., a volume control button, a voice command, a control button on a bluetooth device connected to the mobile computing device 201 in which the emulator 221 is running), the emulator 221 can capture the user inputs 113 via its wireless input devices. For example, a virtual wireless keyboard 243 can capture keyboard events in the user inputs 113 directed to the host device 209 and send the keyboard events to the host device 209 as wireless keyboard input events 257 using a standard protocol, or another protocol.

Similarly, the emulator 221 can capture cursor control events in the user inputs 113 via the virtual wireless mouse 245; and virtual wireless mouse 245 can control the host device 209 based on the corresponding input events 257 according to a standard protocol (or another protocol).

For example, the emulator 221 can identify gestures represented in the user inputs 113 (e.g., based on an accelerator, a touch movement) and use the virtual gesture generator 249 to generate the corresponding input events 257 to control the host device 209.

Optionally, the user 101 can configure the emulator 221 to selectively enable or disable the virtual input/output devices. When the wireless accessory function/connection (e.g., as discussed in connection with FIG. 1) is activated, the enabled virtual wireless devices in the emulator 221 can be connected to the host device 209; and the host device 209 can selectively use the input/output devices based on the context of an application running in the host device 209.

FIG. 5 to FIG. 18 illustrate operations configured in proximity based operating of a mobile computing device using another mobile computing device according to one embodiment.

For example, the proximity based operating of a mobile phone 105 using another mobile phone 103 in FIG. 3 can be set up, activated and performed using at least some of the operations illustrated in FIG. 5 to FIG. 12.

For example, the mobile phones 103 and 105 can be optionally configured to require pairing to allow one of the mobile phones 103 and 105 to function as a wireless accessory of the other one. Thus, a non-paired mobile phone cannot gain access to another mobile phone via wireless connections.

Figure 5:
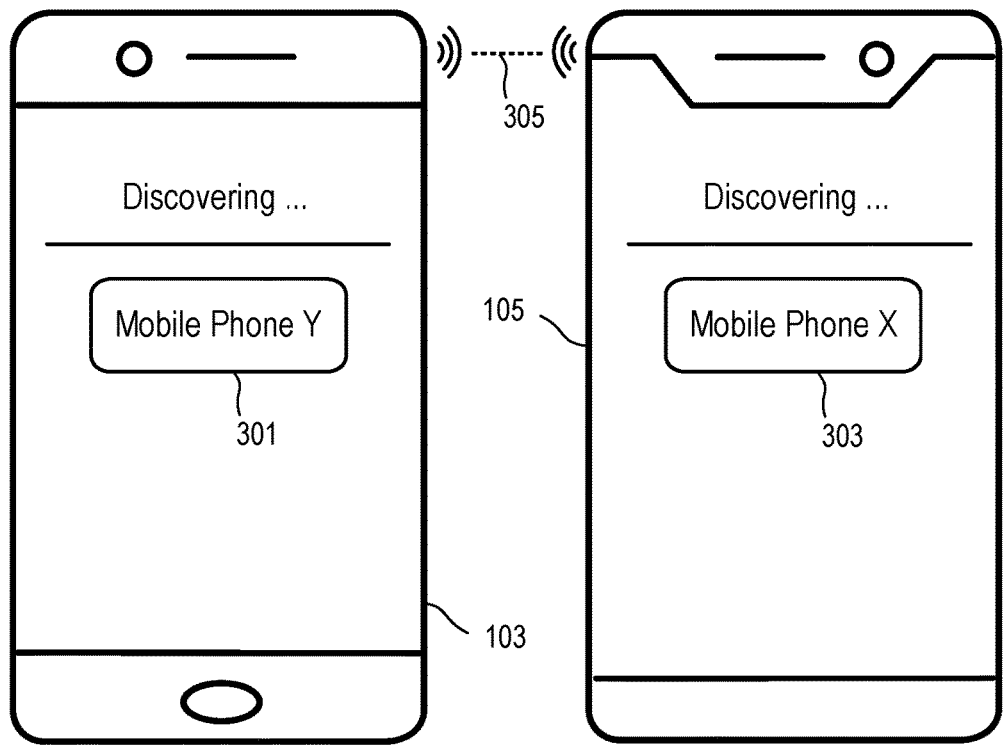
FIG. 5 to FIG. 18 illustrate operations configured in proximity based operating of a mobile computing device using another mobile computing device according to one embodiment.

For example, pairing can be performed in a way similar to the pairing of a bluetooth accessory to a mobile phone. In FIG. 5, the mobile phones 103 and 105 are paired to each other, such that either one of the mobile phones 103 and 105 can be connected to the other one as a wireless accessory (e.g., implemented via a wireless peripheral emulator 221 running in the respective mobile phone).

For example, in FIG. 5, in the discovering process, the mobile phones 103 and 105 can communicate via wireless signals 305 to identify each other. The candidates (e.g., 301, 303) for pairing are shown in the mobile phones 103 and 105. The user 101 can select the candidates to confirm and complete the pairing.

Figure 6:
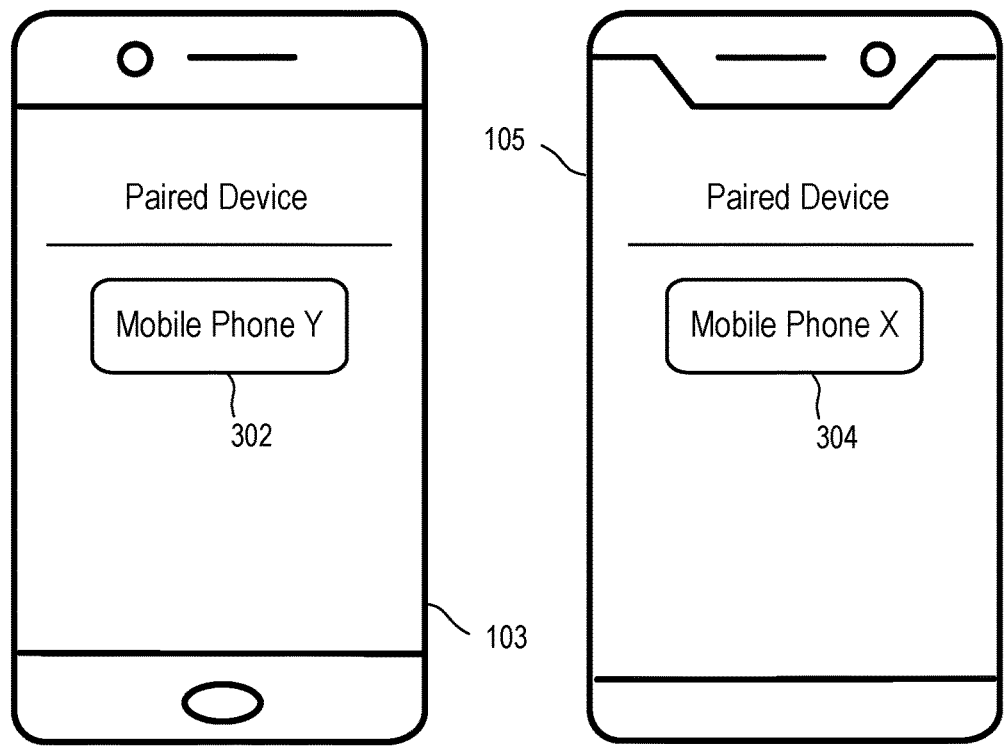

FIG. 6 shows an example where each of the phones 103 and 105 shows a list of devices (e.g., 302; 304) that have been successfully paired.

For example, the mobile phone 103 has an identification of a device 302 that has been paired with the mobile phone 103; and the identity of the device 302 corresponds to the mobile phone 105. Thus, when needed, the mobile phone 105 can be connected to the mobile phone 103 as a wireless accessory.

Similarly, the mobile phone 105 has an identification of a device 304 that has been paired with the mobile phone 105; and the identity of the device 304 corresponds to the mobile phone 103. Thus, when needed, the mobile phone 103 can be connected to the mobile phone 105 as a wireless accessory.

Optionally, the operations of pairing for connection authorization can be skipped when the security is based on a small proximity radius 123 (e.g., with a meter or 12 inches, or based on a time window from when the mobile phones are in range for near field communications).

Optionally, the proximity radius 123 is established and/or customized via the user moving the mobile phones 103 and 105 around to demonstrate typical positions of the mobile phones 103 and 105 relative to each other when the enabling of the proximity based operations is desirable.

Figure 7:
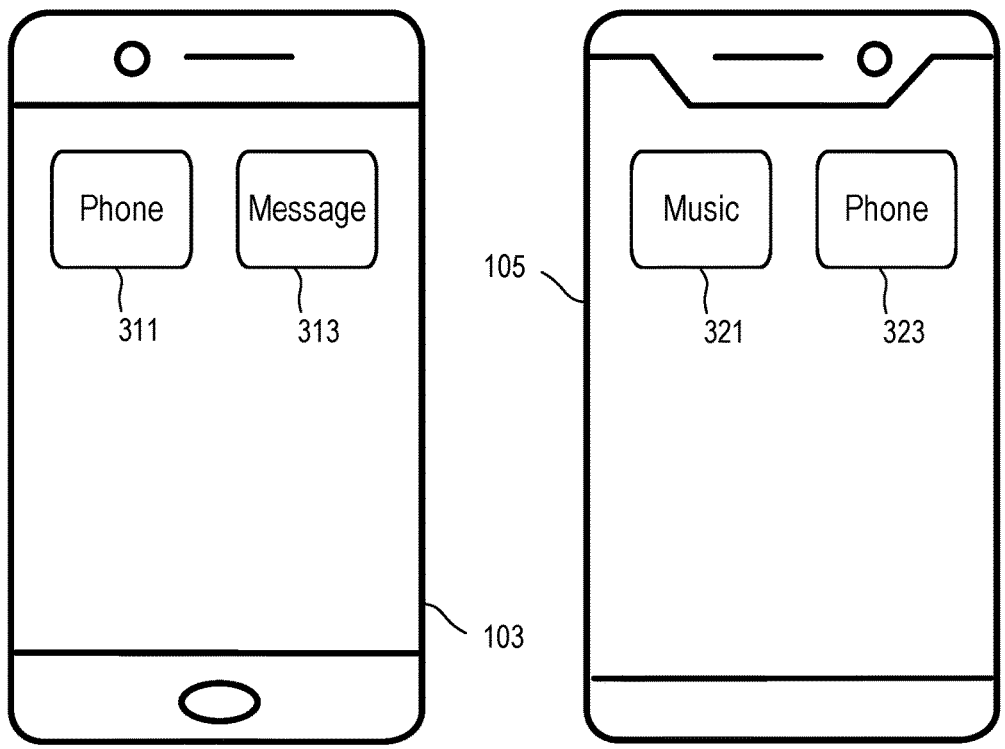

FIG. 7 shows examples of mobile phones 103 and 105 that are both being used directly by the user 101. Thus, the mobile phones 103 and 105 are not connected to each other in the example of FIG. 7. In FIG. 7, the mobile phone 103 is seen to have a set of mobile applications (e.g., 311, 313); and the mobile phone 105 is seen to have another set of mobile applications (e.g., 321, 323).

Figure 8:
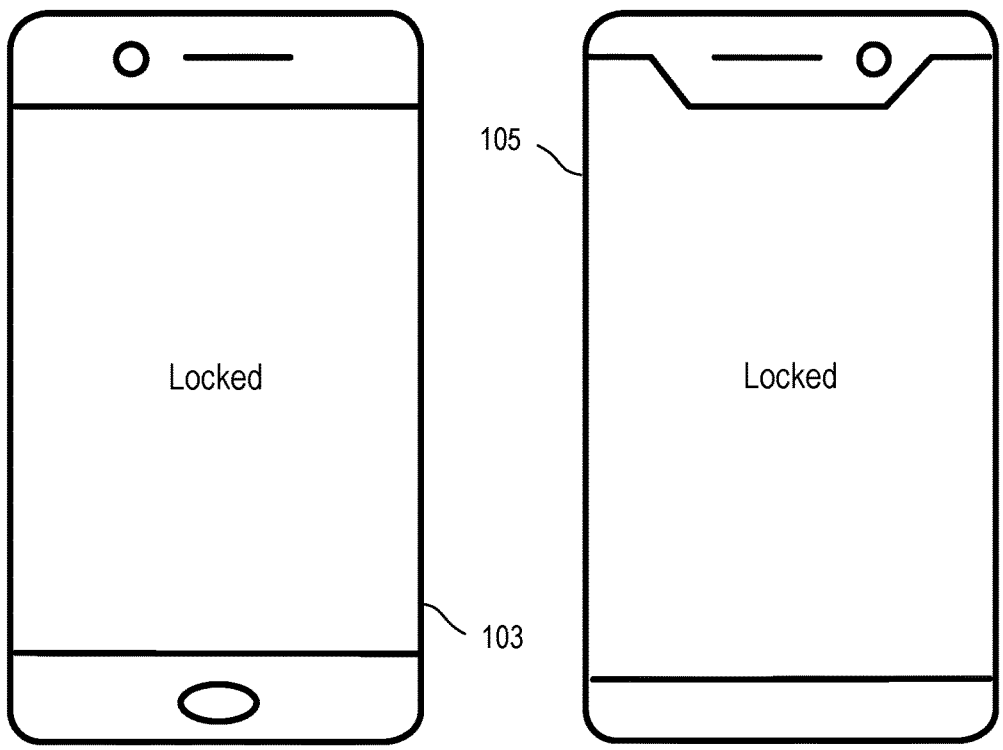

FIG. 8 shows examples of mobile phones 103 and 105 that are both not being used directly by the user 101. For example, the mobile phones 103 and 105 can each show a lock screen (or have their screens turned off); and thus, the mobile phones 103 and 105 are not connected to each other in the example of FIG. 8.

FIG. 9 to FIG. 12 show operations corresponding to the scenario illustrated in FIG. 1.

Figure 9:
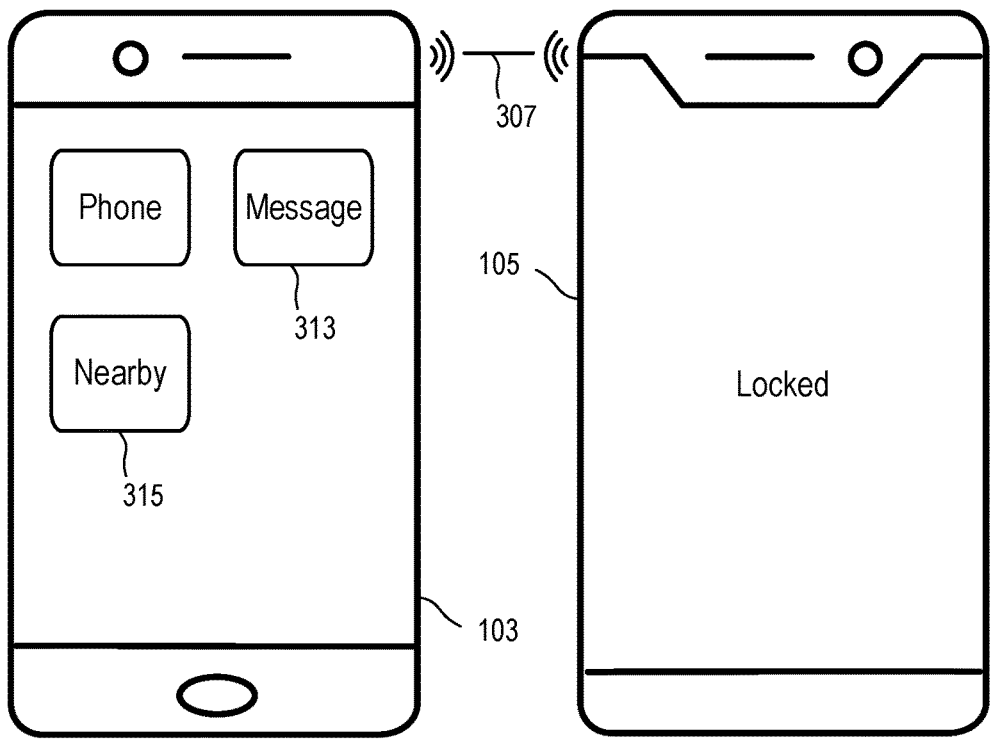

In FIG. 9, the user 101 picks up the mobile phone 103 for interaction and leaves the mobile phone 105 showing the lock screen (or having its screen being turned off). Based on the distance 125 between the phones 103 and 105 being shorter than the proximity radius 123, the virtual peripheral emulator 221 running in the mobile phone 103 is connected via a wireless connection 307 between the mobile phones 103 and 105. The mobile phone 103 shows an icon 315 to indicate that the mobile phone 103 can be used to operate a nearby connected mobile phone 105.

The user 101 may choose to operate the mobile phone 103 (e.g., using the message application 313) without operating on the nearby connected mobile phone 105.

Alternatively, the user 101 may choose to active the icon 315 to start interacting with the nearby mobile phone 105 using the mobile phone 103 as a wireless input/output device connected to the mobile phone 105 via the connection 307.

Optionally, the activation of the function associated with, or represented by the icon 315, can be via a voice command, a gesture, a keyboard short cut (e.g., when the mobile phone is connected to a keyboard wirelessly, or via the port 239), etc.

Figure 10:
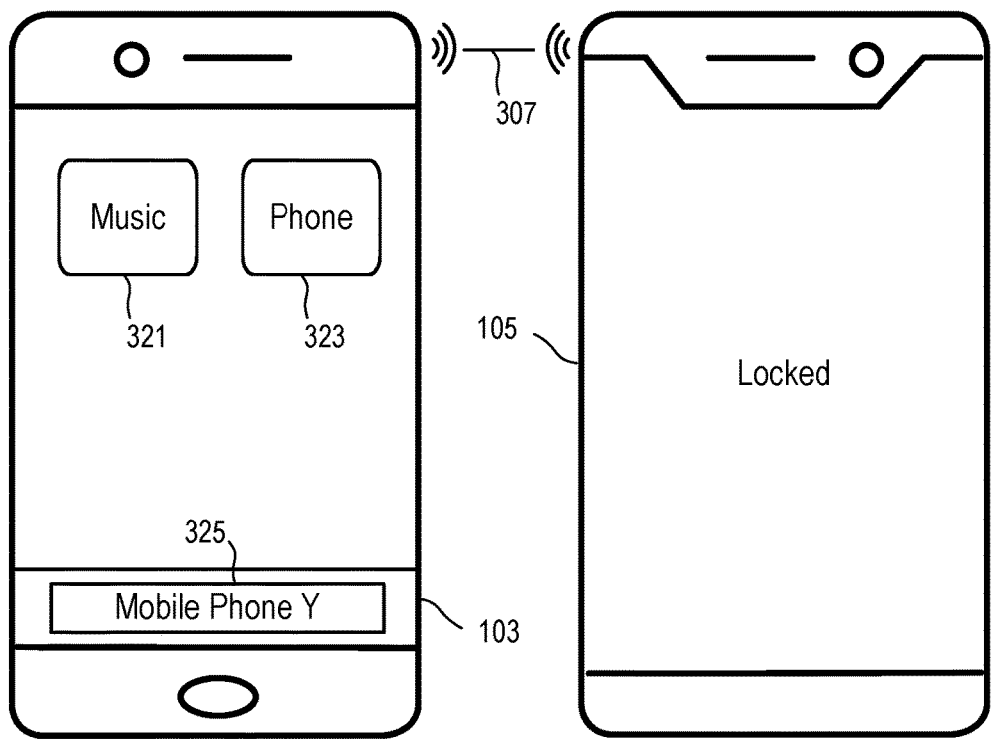

FIG. 10 illustrates an example after the user 101 activates the function represented by the nearby icon 315. The screen of the mobile phone 103 shows a screen image of the mobile phone 105 (e.g., the screen image of the mobile phone as illustrated in FIG. 7).

Optionally, the mobile device 103 can show an indication 325 that the screen image is from the nearby phone 105; and as a result, the inputs received in the mobile phone 103 are directed to the nearby mobile phone 105; and the responses (e.g., audio, video, and other outputs) are from the nearby phone 105.

Figure 11:
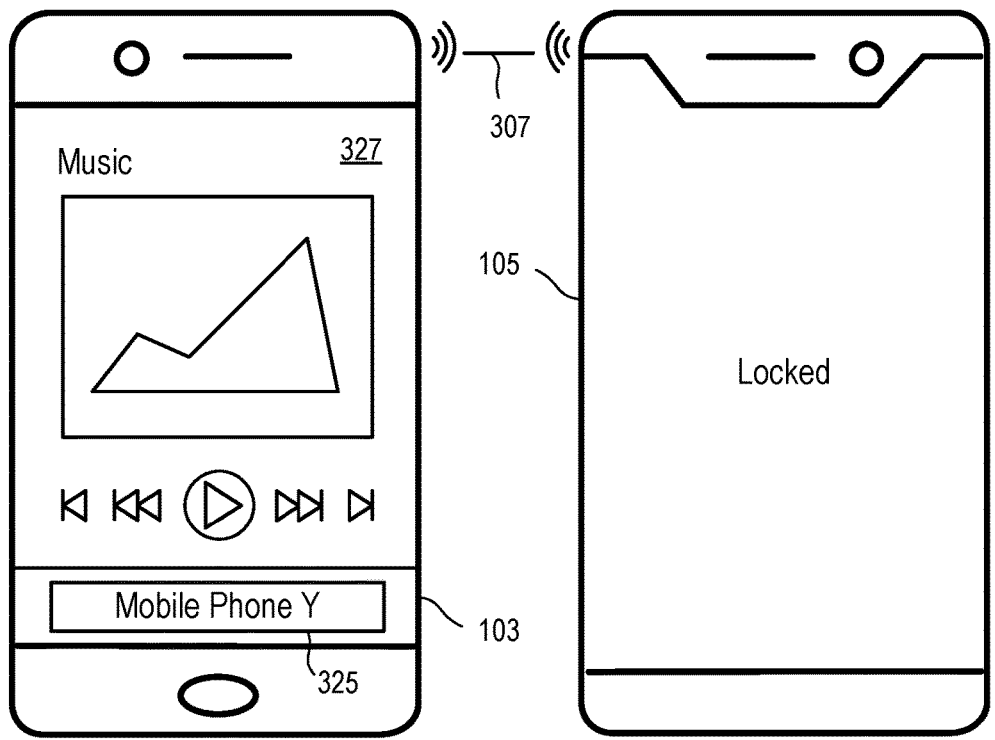

For example, the user may select the icon for a music application 321 shown on the touch screen of the mobile phone 103 to start the music application 321 in the nearby phone 105, resulting in an example illustrated in FIG. 11.

In FIG. 11, the display content 327 of the music application 321 running in the nearby phone 105 is sent or streamed to the virtual wireless screen 241 in the wireless peripheral emulator 221 connected by the mobile phone 103 as an accessory to the mobile phone 105. The emulator 221 presents the display content 327 on the touch screen 211 of the mobile phone 103.

For example, when the screens of the mobile phones have different sizes/resolutions, the emulator 221 can resize the display content 327 for optimal display effects.

Optionally, the indication 325 of the display being from the nearby phone 105 can be overlaid on the display content 327 of the nearby phone 105. The user may move it to a location (e.g., top, or a corner) to avoid obscuring a portion of display content of interest.

Optionally, the indicator 325 displayed periodically and not displayed in between. Alternatively, the indicator 325 can be displayed in a fixed screen area that is reserved for the indicator 325; and the display content 327 is mapped to a region outside of the area reserved to show the indicator 325.

In some implementations, the indicator 325 is activatable to cause the mobile phone 105 to return to its home screen.

In some implementations, the wireless peripheral emulator 221 is packaged in an application. Thus, the user may return to the operating of an application running in the mobile phone 103 by activating the display of applications running in the mobile device 103, as in FIG. 12.

Figure 12:
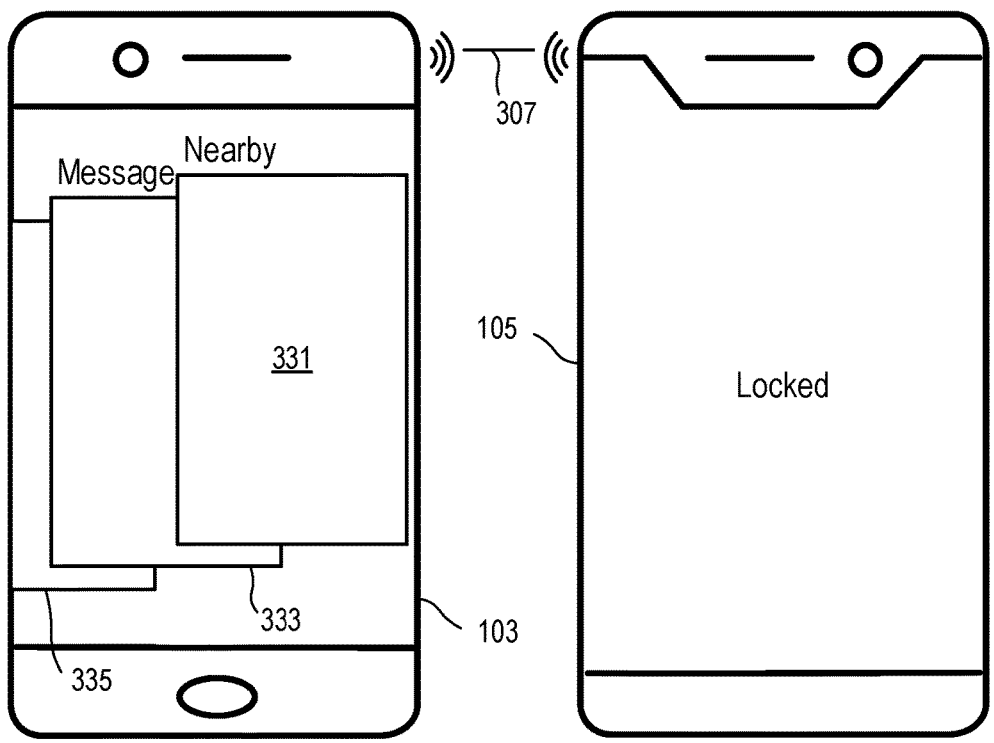

In FIG. 12, the mobile phone 103 shows a set of applications running in the mobile phone, include a nearby application 315 representing the use of the wireless peripheral emulator 221 to control/interact with the nearby phone 105. The nearby application 315 can be shown as a representative image 331 of the nearby application 315. The representative image 331 can be selected to return to the nearby application 315, or dismissed to close the nearby application 315. Alternatively, the user 101 may select the representative image (e.g., 333 or 335) of another application to return to the application represented by the selected image (e.g., 333 or 335).

In some implementations, the connection 307 is disconnected when the user starts to operate directly on the nearby phone 105; and the nearby application 331 in the mobile phone 103 is closed as a result.

For example, when the user picks up the mobile phone 105 and starts to use a user interface element of the mobile phone 105 following the opening of the music application 321 via the mobile phone 103 as in FIG. 11, the nearby application running 315 in the mobile phone 103 is closed; and the display content 327 of the music application 321 is shown on the screen of the mobile phone 105.

Figure 13:
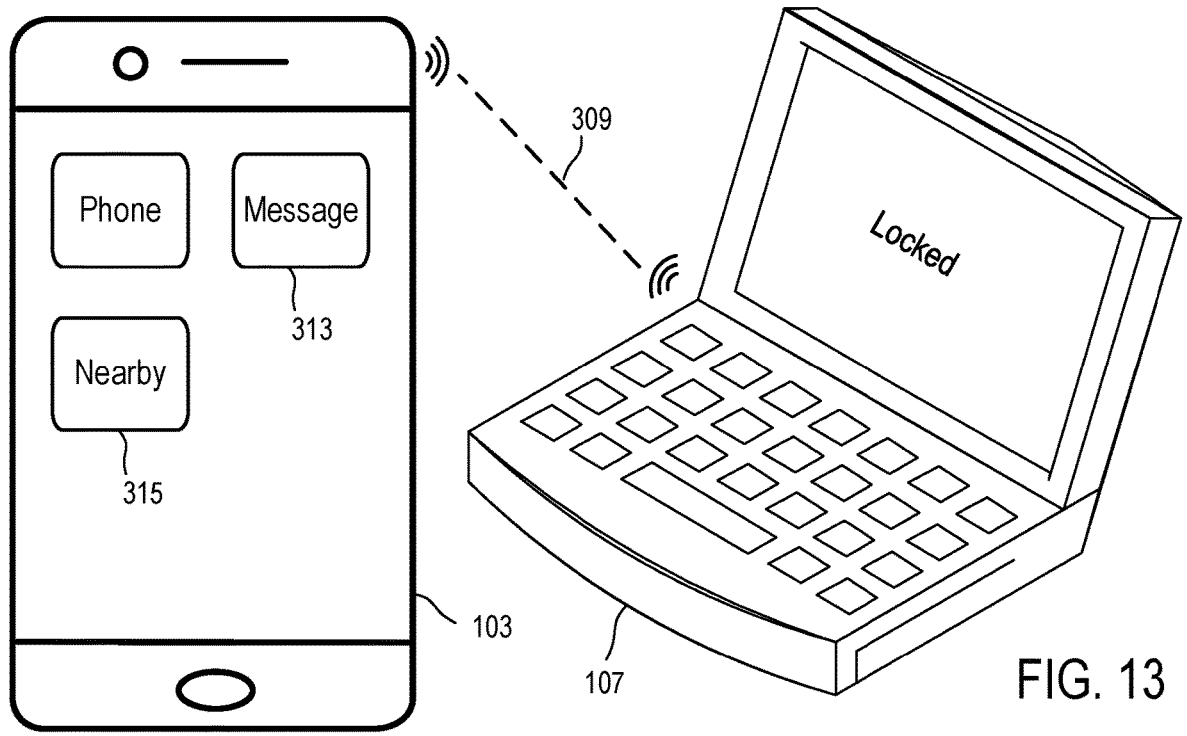
Figure 14:
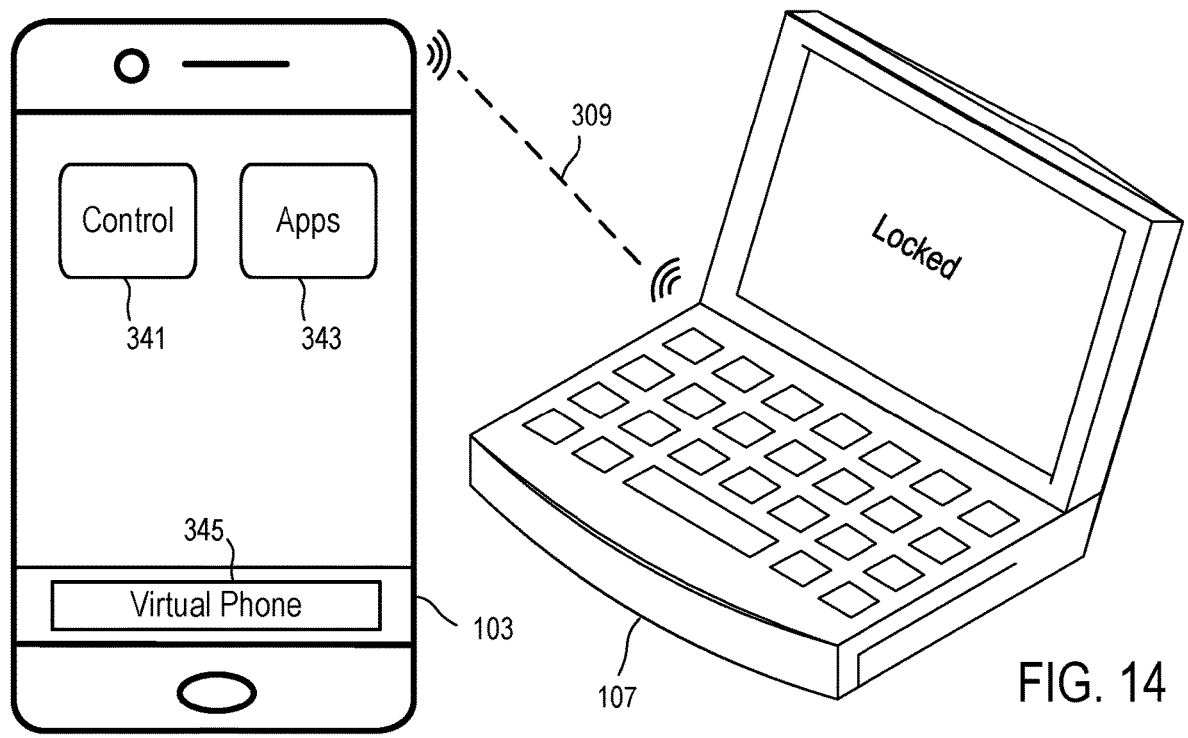

In some instances, it can be advantageous to use a mobile phone (e.g., 103) as a remote control for a nearby computer (e.g., a notebook computer, a personal computer, a tablet computer), as illustrated in FIG. 13 and FIG. 14.

In FIG. 13 and FIG. 14, a computer (e.g., 107) is configured to run a mobile phone emulator.

When the conditions for proximity operating of the computer 107 are satisfied, a wireless connection 309 between the mobile phone 103 and the nearby computer 107 can be established, in a way similar to the establish the connection 307 in FIG. 9.

For example, the conditions for proximity operating of the computer 107 using the mobile phone 103 can include the mobile phone 103 being within a predetermined proximity radius 123 from the computer 107; and the predetermined proximity radius 123 can be customized for the computer 107 (e.g., different from the proximity radius 123 for the proximity operations between the mobile phones 103 and 105). Further, the conditions can include the mobile phone 103 being in the hand of the user 101 for direct interactions, and the computer 107 not being operated upon directly by the user 101 (e.g., having a locked screen, or its screen/display device being turned off).

As in FIG. 9, the mobile phone 103 displays an icon 315 to indicate that the mobile phone 103 is ready to be used to operate a nearby device. When the user 101 actives the icon 315, the mobile phone 103 runs an application to show the screen of the mobile phone emulator running in the computer 107, in a way similar to the mobile phone 103 shows the screen image of a nearby mobile phone 105 in FIG. 10.

For example, in FIG. 14, the computer 107 runs a mobile phone emulator; and the mobile phone 103 operates as a wireless accessory to the mobile phone emulator over the connection 309 to provide input/output functions, such as display, audio input, audio output, cursor control, selection, keyboard events, etc.

Similar to FIG. 10, FIG. 14 shows a home screen of the mobile phone emulator running in the computer 107. The home screen can include a list of applications (e.g., 341, 343) controllable via the mobile phone 103. The mobile phone 103 further shows an indicator 345 that the application (e.g., representing the wireless peripheral emulator 221 running in the mobile phone 103) is connected to a virtual phone 345 running in a nearby computer.

In some instances, it can be advantageous to use the input/output devices of a computer (e.g., 107) to operate the mobile phone 103. Thus, the computer 107 can also be configured to run a wireless peripheral emulator 221, as illustrated in FIG. 15.

Figure 15:
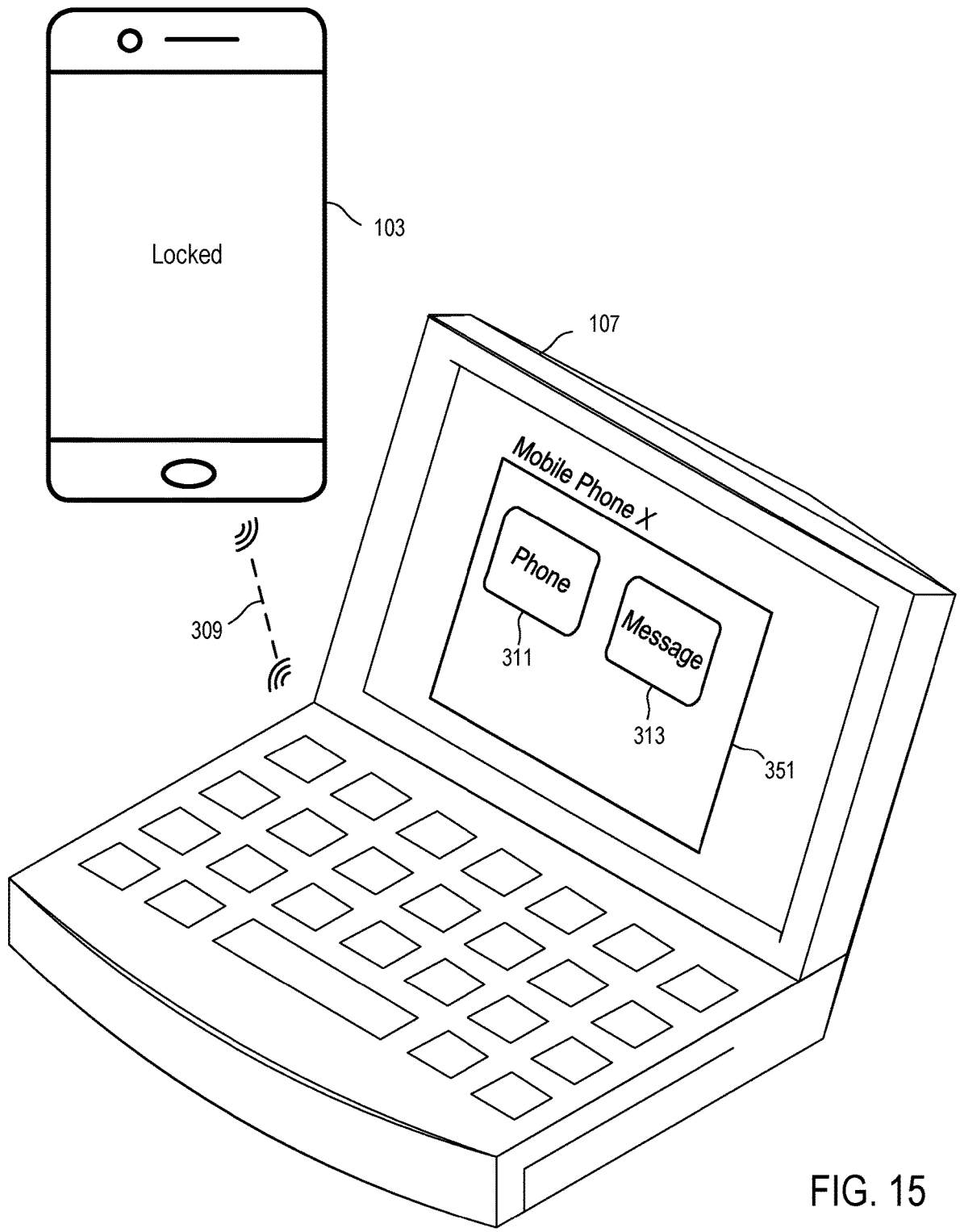

As in FIG. 15, when the conditions for proximity operating of the mobile phone 103 and the computer 107 are satisfied, a wireless connection 309 between the mobile phone 103 and the nearby computer 107 can be established, in a way similar to the establish the connection 309 in FIG. 13.

For example, the conditions for proximity operating of the mobile phone 103 using the computer 107 can include the mobile phone 103 being within the same predetermined proximity radius 123 for proximity operations of the computer 107 using the mobile phone 103. Further, the conditions can include the mobile phone 103 not being operated upon directly by the user 101 (e.g., having a locked screen, or its screen/display device being turned off), and the computer 107 is being operated upon directly by the user 101.

FIG. 15 shows a home screen of the mobile phone 103 being shown on the display device of the computer 107. The home screen can include a list of applications (e.g., 311, 313) controllable via the computer 107. For example, a portion 351 of the display area of the computer 107 can be allocated as the display device implementing the virtual wireless screen 241 attached to the mobile device 103 over the connection 309. The portion of the display area can be presented within a window of a graphical user interface in the computer 107; and a title bar of the window can indicate that the wireless peripheral accessory running in the computer 107 is attached to the mobile phone 103.

Figure 16:
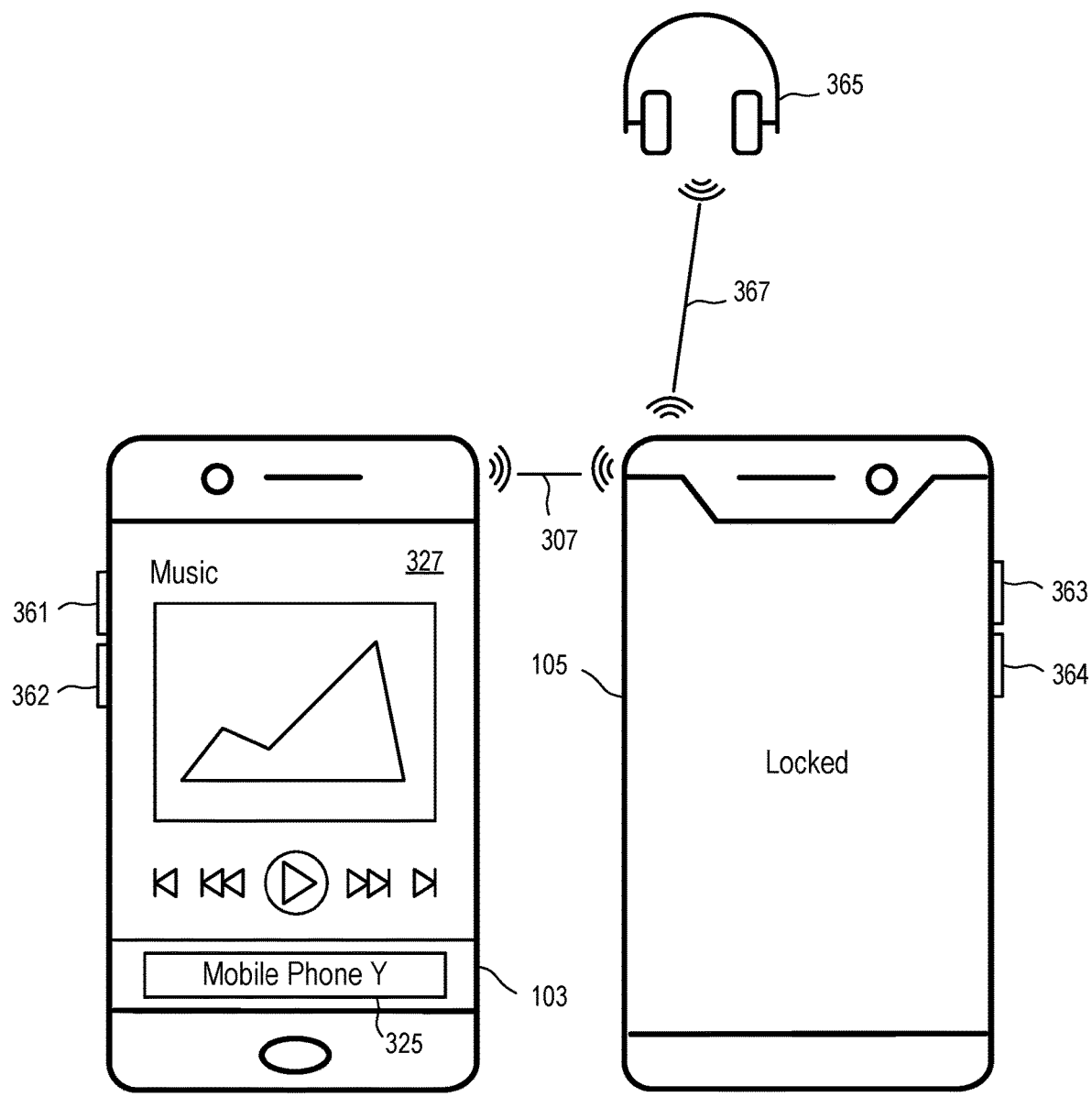

FIG. 16 illustrates the use of volume buttons 361 and 362 of the mobile phone 103 to control the volume of sound or music played in a bluetooth audio accessory 365 (e.g., a head phone, a pair of earphones, a soundbar, a wireless speaker) connected to the nearby mobile phone 105.

For example, when the user 101 presses a volume button (e.g., 361 or 362) on a first mobile phone (e.g., 103), the first mobile phone (e.g., 103) can automatically (or present to the user 101 with options to select) control the bluetooth volume of a second, nearby mobile phone (e.g., 105), when the first mobile phone (e.g., 103) determines that the user 101 is listening using a bluetooth device (e.g., audio accessory 365) connected to the second mobile phone (e.g., 105).

For example, when the mobile phones 103 and 105 are linked with the connection 307 and determine that the current active audio or sound outputs of the mobile phone 103 and 105 as a whole system are played in the bluetooth audio accessory 365 connected to the nearby mobile phone 105, the volume buttons 361 and 362 can automatically become usable to control the volume of the bluetooth audio accessory 365. In such a situation, the volume buttons 361 and 362 of the mobile phone 103 can be connected to function as wireless volume buttons of the nearby mobile phone 105.

For example, when the volume up button 361 of the mobile phone 103 is pressed, the mobile phones 103 and 105 determine that the volume up request is applicable to the volume of the bluetooth audio accessory 365 connected to the nearby mobile phone 105, the request is implemented via the nearby mobile phone 105 and a bluetooth connection 367, in a way similar to the volume up button 363 of the mobile phone 105 being pressed. Similarly, when the volume down button 362 of the mobile phone 103 is pressed, the volume of the bluetooth audio accessory 365 connected to the nearby mobile phone 105 is decreased, as if the volume down button 364 of the mobile phone 105 were pressed. Thus, the volume buttons 361 and 362 can be dynamically and/or automatically configured as remote volume buttons of the nearby mobile phone 105 based on a determination that the mobile phone 103 currently has no active usages of an audio device.

The determination of volume up/down requests being applicable to the volume of the bluetooth audio accessory 365 connected to the nearby mobile phone 105 can be based on a determination that the bluetooth audio accessory 365 is the only audio device that is currently actively being used by the mobile phones 103 and 105 as a whole.

In some implementations, when the mobile phone 103 has no active audio outputs, the volume up/down requests generated in response to the activations of the volume buttons 361 and 362 of the mobile phone 103 can be automatically transmitted to the nearby mobile phone 105 over the connection 307 as part of the user inputs 113 provided via the wireless peripheral emulator 221 to the nearby mobile phone 105 as the host device 209.

In some implementations, when the mobile phone 103 is being actively used to control a particular application (e.g., music application 321) running in the nearby mobile phone 105, the volume buttons 361 and 362 of the mobile phone 103 are configured to control the active audio device currently being used by the application (e.g., music application 321), even when the mobile phones 103 and 105 as a whole have multiple active audio devices.

For example, when the display content 327 of the music application 321 running in the nearby phone 105 is shown on the screen of the mobile phone 103 (e.g., as in FIG. 11), not only the touch screen of the mobile phone 103 is configured as a wireless input device for the nearby mobile phone 105, the volume buttons 361 and 362 are also configured as a wireless volume buttons of the nearby mobile phone 105.

Optionally, when the mobile phones 103 and 105 have multiple active audio applications/output devices, the mobile phone 103 can present one or more options to the user 101 to decide which of the applications/output devices is to be controlled by the activation of the volume buttons 361 and 362. For example, the volume buttons 361 and 362 can be selectively configured to control the volume of a phone application 311 running in the mobile phone 103, a phone application 323 running in the nearby mobile phone 105, a bluetooth audio accessory 365 connected to the mobile phone 105 (or the mobile phone 103), etc.

Figure 17:
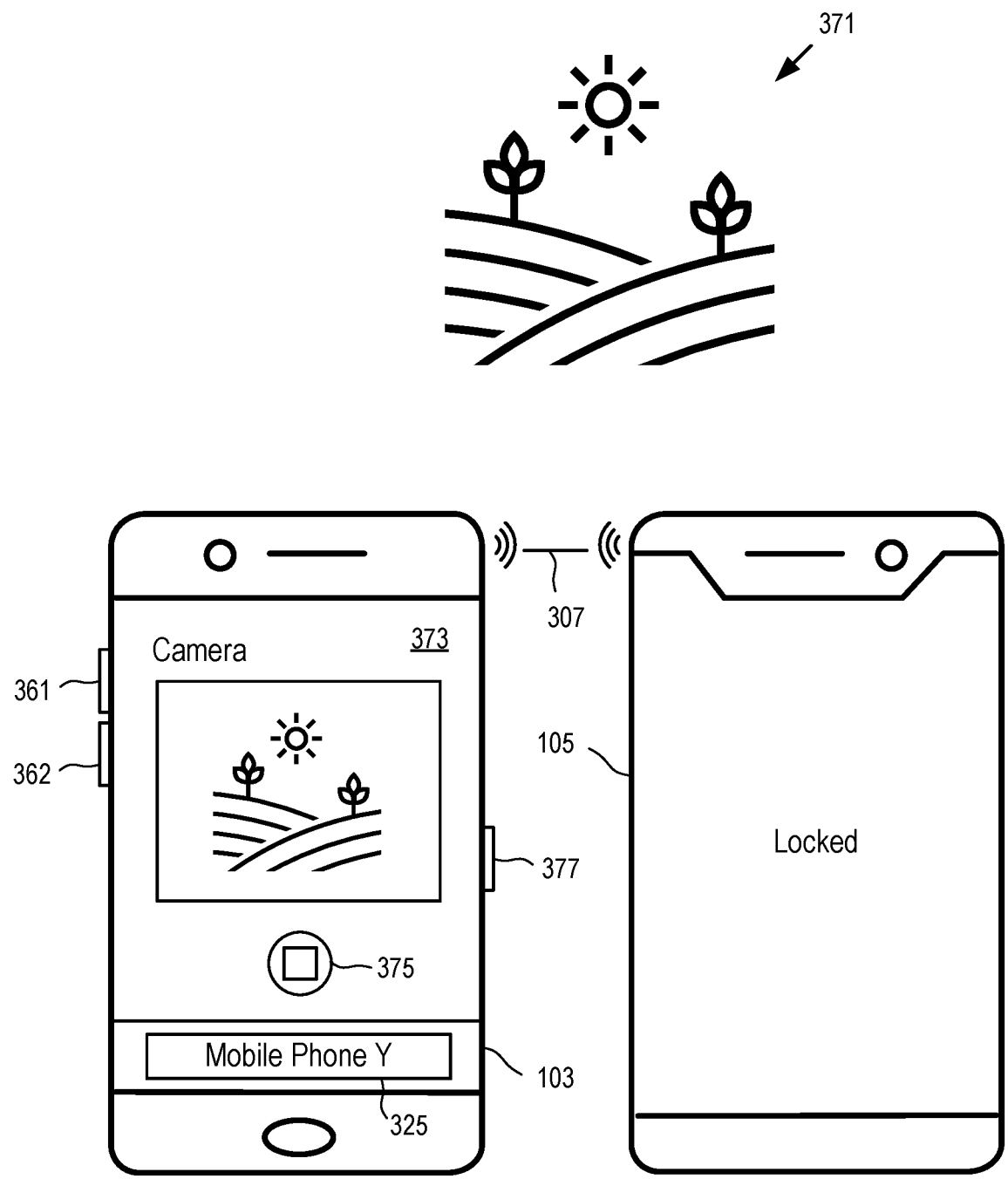

FIG. 17 illustrates the operations of a camera application using the resources of the mobile phones 103 and 105.

For example, if the user 101 takes a photo on a first mobile phone 103, the user 101 is given the option of transferring that photo to a second, nearby mobile phone 105. Such a function is useful when the user 101 pulls the first mobile phone 103 out of his or her pocket to take a picture, but wants the resulting photo to be in the second mobile phone 105 without having to change phones to take the picture using the camera of the second mobile phone 105. For example, if the user 101 pulls out his or her personal phone to take a picture of a business-related receipt, the user 101 can take the picture and have his personal phone to transfer the photo to the business phone. The user 101 can avoid the photo being stored in the picture library within the personal phone. Rather the photo is transferred to the business phone and stored in the picture library there just as if the photo had been taken by the business phone without involving the personal phone. For example, based on the connection 307, the camera/image sensor of the personal phone can function as a wireless remote camera/image sensor connected to the business phone.

For example, a camera application running in the nearby mobile phone 105 can present its user interface over the connection 307 for display as content 373 on the touch screen of the mobile phone 103 (e.g., in a way similar to a music application 321 displaying its content 327 on the touch screen of the mobile phone 103 in FIG. 11).

Optionally, the camera application running in the nearby mobile phone 105 with a graphical user interface configured on the mobile phone 103 can use any of the image sensors/cameras configured in the mobile phone 103 and the mobile phone 105, such as the cameras/image sensors installed on the front side and/or the back side of the mobile phone 103, image sensors/cameras configured in the mobile phone 105, etc. The user interface of the camera application can be configured to present options for the user 101 to select one of the available cameras/image sensors in the mobile phones 103 and 105 to capture a photo or a video clip (e.g., via activating an icon 375 in the graphical user interface of the camera application, or a physical button, such as a power button 377 or a volume button 361 or 362 of the mobile phone 103).

Optionally, when the mobile phone 103 is active and the mobile phone 105 is in a locked state, the camera application can automatically use one of the cameras/image sensors of the mobile phone 103 as the wireless camera connected over the connection 307 for the camera application running in the nearby mobile phone 105 in taking a photo or a video clip of the scene 371, eliminating or de-prioritizing the use of the cameras/image sensors of the nearby mobile phone 105.

After the camera application running in the nearby mobile phone 105 takes a photo or video shot using the camera/image sensor of the mobile phone 103, the camera application can store the image/video data in the camera roll in the nearby mobile phone 105 (e.g., without saving the data in the mobile phone 103). Optionally, the camera application can offer to store the image/video data in the camera roll in the mobile phone 103 (e.g., using the mobile phone 103 as a storage device), or store copies of the image/video data in the camera rolls in both the mobile phones 103 and 105.

In some implementations, when the mobile phones 103 and 105 are connected via the connection 307 based on proximity, a camera application running in the mobile phone 103 can also offer to store captured image/video data into the camera roll of the nearby mobile phone 105 (with or without storing the image/video data in the camera roll of the mobile phone 103).

Optionally, after the mobile phones 103 and 105 are paired for proximity based operations (e.g., as in FIG. 9 to FIG. 17), the user 101 can set security parameters (e.g., in the application or system module represented by the nearby icon 315) to specify permissions for wireless access and/or resource sharing.

For example, the user 101 can select which applications installed on the mobile phone 103 can and cannot be controlled by the mobile phone 105 through the linking application (or system module) represented by the nearby icon 315. For example, the user 101 can tell the linking application (module) on a first phone (e.g., 103) that the text and email applications on that first phone (e.g., 103) can be controlled by a second phone (e.g., 105), but that the second phone (e.g., 105) cannot be used to answer a call to the first phone (e.g., 103), as illustrated in FIG. 18.

Figure 18:
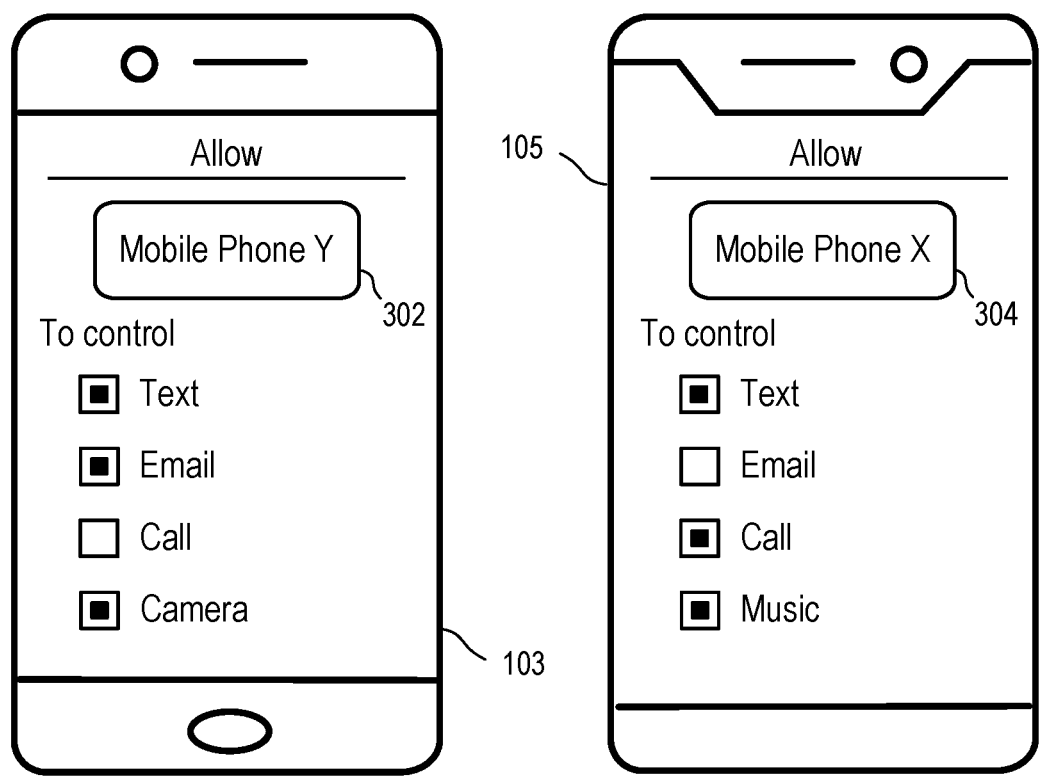

In FIG. 18, each of the mobile phones 103 and 105 displays an option list for the user 101 to specify permissions for the other phone to control and/or access its applications and resources over a wireless connection (e.g., 307 in FIG. 9 to FIG. 12 and FIG. 16 to FIG. 17).

For example, the mobile phone 103 shows a list indicating the current permissions configured for a mobile phone 105 identified by the icon 302 shown on the screen of the mobile phone 103. The list indicates that the mobile phone 105, represented by the icon 302, is allowed to control/access the text function of the mobile phone 103 (e.g., provided via a message application 313 running in the mobile phone 103), but not allowed to control/access the call function (e.g., provided via a phone application 311 running in the mobile phone 103).

Similarly, the list shown on the screen of the mobile phone 105 indicates that the mobile phone 103, represented by the icon 304, is allowed to control/access the call function of the mobile phone 105 (e.g., provided via a phone application 323 running in the mobile phone 105) and a music application 321 in the mobile phone 105, but not allowed to control/access an email application running in the mobile phone 105.

For example, the user 101 can toggle the selection of an item to allow or disallow control/access of the item over a wireless connection 307 when the mobile phones 103 and 105 are in vicinity of each other for proximity based operations.

In general, the permission lists can include more or less items than those illustrate in FIG. 18. For example, a permission list for a mobile device (e.g., 103) can be configured to display and used to modify the permissions for a particular nearby mobile device (e.g., 105) in accessing, controlling, and/or using various mobile applications and resources of the mobile device (e.g., 103). For example, permissions can be set to allow or disallow the use of input/output devices of the mobile phone (e.g., 103) by a nearby mobile phone (e.g., 105), such as virtual wireless peripheral devices (e.g., 243, 245, 247, 249), cameras, camera roll storage functions, volume buttons 361 and 362, the power button 377, etc.

Figure 19:
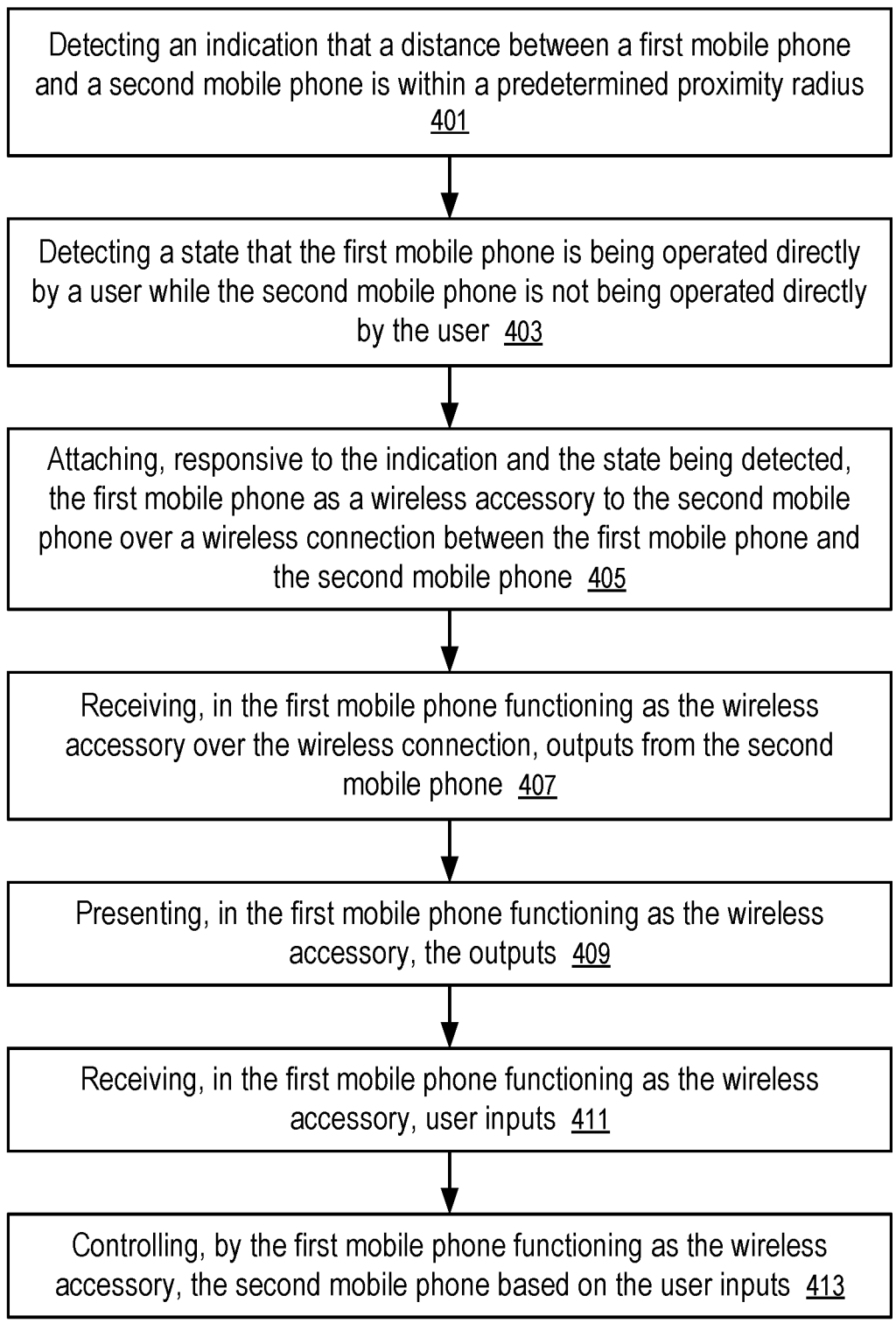
FIG. 19 shows a method of proximity based operations according to one embodiment.

FIG. 19 shows a method of proximity based operations according to one embodiment.

For example, the method of FIG. 19 can be performed in a mobile phone 103 in FIG. 1, a mobile phone 105 in FIG. 2, a mobile computing device 201, or a computing device 107 in FIG. 15.

At block 401, the method of FIG. 19 includes detecting an indication that a distance 125 between a first mobile phone (e.g., 103) and a second mobile phone (e.g., 105) is within a predetermined proximity radius 123.

For example, the predetermined proximity radius 123 is no greater than a meter. Each of the first mobile phone (e.g., 103) and the second mobile phone (e.g., 105) runs a mobile operating system (e.g., iOS, Android), is configured with a touch screen (e.g., 211) and a plurality of wireless communications devices (e.g., 231, 233, 235, 237) including a cellular communications transceiver (e.g., 237), and has a size adapted for being carried in pockets. For example, the first mobile phone (e.g., 103) and the second mobile phone (e.g., 105) can run different mobile operating systems (e.g., iOS, Android) and can have different sets of mobile applications.

At block 403, the method includes detecting a state that the first mobile phone 103 is being operated directly by a user 101 while the second mobile phone 105 is not being operated directly by the user 101.

At block 405, the method includes attaching the first mobile phone 103 as a wireless accessory to the second mobile phone 105 over a wireless connection 307 between the first mobile phone 103 and the second mobile phone 105. The attaching can be responsive to the indication that a distance 125 is within the predetermined proximity radius 123, the state of the first mobile phone 103 is being operated directly, and the second mobile phone 105 is not being operated directly, At block 407, the method includes receiving, in the first mobile phone 103 functioning as the wireless accessory over the wireless connection 307, outputs 255 from the second mobile phone 105 as a host device 209.

For example, the second mobile phone 105 runs a mobile application configured to make phone calls (e.g., a phone application), to capture pictures (e.g., a camera application), or to play music (e.g., a music application), or to provide other functions, such as texting, emailing, social networking, messaging, etc.

At block 409, the method includes presenting, in the first mobile phone 103 functioning as the wireless accessory, the outputs 255 generated by the mobile application running in the second mobile phone 105.

At block 411, the method includes receiving, in the first mobile phone 103 functioning as the wireless accessory, user inputs 113 to the mobile application running in the second mobile phone 105.

At block 413, the method includes controlling, by the first mobile phone 103 functioning as the wireless accessory over the wireless connection 307, the second mobile phone 105 based on the user inputs 113 received in the first mobile phone 103.

For example, the operations in blocks 405 to 413 can be configured automatically and responsive to the indication the distance 125 is within the predetermined proximity radius 123 of no greater than one meter (or two feet) and responsive to the state that the first mobile phone 103 is directly operated by the user 101 while the second mobile phone 105 is not directly operated by the user 101.

For example, the mobile application can be a phone application 323 running in the second mobile phone 105; and the user can use the first mobile phone 103 to pick up a phone call to the second mobile phone 105 and use the first mobile phone 103 as a wireless handset of the second mobile phone 105.

For example, the mobile application can be a camera application running in the second mobile phone 105; and the user can use the first mobile phone 103 as a wireless camera of the second mobile phone 105 to capture photos and video clips, as illustrated in FIG. 17.

For example, when an image sensor of the first mobile phone 103 captures an image, the first mobile phone 103 is operable to offer storing the image over the wireless connection into the second mobile phone 105 without retaining the image in the first 103 mobile phone.

For example, the mobile application can be a music application 321 running in the second mobile phone 105; and the user can use volume buttons 361 and 362 of the first mobile phone 103 as a wireless volume controller of the second mobile phone 105 playing music to a bluetooth audio accessory 365, as illustrated in FIG. 16.

For example, the mobile application can be a music application 321 running in the second mobile phone 105; and the user can use the touch screen of the first mobile phone 103 as a wireless user interface of the second mobile phone 105 controlling the operations of the music application 321, as illustrated in FIG. 11.

For example, the wireless accessory can be implemented via an application or system module (e.g., wireless peripheral emulator 221) running in the first mobile phone 103.

For example, the wireless accessory can be configured to provide a touch screen function to the second mobile phone 105 using a touch screen 211 of the first mobile phone 103.

For example, a touch screen of the second mobile phone 105 can remain locked or turned off (e.g., as illustrated in FIG. 9 to FIG. 12) while the first mobile phone 103 is functioning as the wireless accessory to the second mobile phone 105 over the wireless connection 307.

For example, the method can further include: presenting an indication 325 identifying the second mobile phone 105 on the touch screen 211 of the first mobile phone 103 while the first mobile phone 103 is functioning as the wireless accessory to the second mobile phone 105 over the wireless connection 307.

For example, the method can further include: terminating the wireless connection 307 in response to the distance 125 between the first mobile phone 103 and the second mobile phone 105 becomes greater than the predetermined proximity radius 123; the touch screen of the second mobile phone 105 becomes active, or a physical button or user interface element (e.g., a power button, a home button, a volume button, a power button, a finger printer scanner, a facial recognition camera) on the second mobile phone 105 is used.

For example, the indication that the distance 125 between the first mobile phone 103 and the second mobile phone 105 is within the predetermined proximity radius 123 can be based on signal strength levels of wireless communications signals exchanged between antennas of the first mobile phone 103 and the second mobile phone 105; and the predetermined proximity radius 123 can be customizable to be substantially smaller than a communication range of the wireless connection 307.

For example, the indication that the distance 125 between the first mobile phone 103 and the second mobile phone 105 is within the predetermined proximity radius 123 is based on a predetermined time window from a time instance when the first mobile phone 103 and the second mobile phone 105 are in communication via a technique of near field communication.

Optionally, the predetermined proximity radius 123 can be customized to be no greater than one meter (or 24 inches).

For example, the application or system module can be configured to provide a plurality of virtual wireless devices to process the inputs 113 to and the outputs 255 from the second mobile phone 105 as a host device 209. For example, plurality of virtual wireless devices can include a virtual wireless screen 241 (or virtual touch screen), a virtual wireless mouse 245 a virtual wireless microphone 247, a virtual wireless speaker, or a virtual gesture generator 249, or any combination thereof.

For example, after a paring operation (e.g., as illustrated in FIG. 5 and FIG. 6), the second mobile phone 105 is also dynamically attachable as a wireless accessory to the first mobile phone 103 over a wireless connection between the first mobile phone 103 and the second mobile phone 105, when the distance 125 between the first mobile phone 103 and the second mobile phone 105 is smaller than the proximity radius 123. Whether the first mobile phone 103 is attached as a wireless accessory to the second mobile phone 105 or the other way around can be based on which is of the mobile phones 103 and 105 is being operated directly by the user and which is not being operated directly by the user, For example, when the touch screen of the first mobile phone 103 is active while the touch screen of the second mobile phone 105 is inactive, the first mobile phone 103 can be dynamically attached as a wireless accessory to the second mobile phone 105. When the touch screen of the first mobile phone 103 is inactive while the touch screen of the second mobile phone 105 is active, the second mobile phone 105 can be dynamically attached as a wireless accessory to the first mobile phone 103. When the touch screens of the first mobile phone 103 and the second mobile phone 105 are both active or both inactive, the first mobile phone 103 and the second mobile phone 105 operate independent from each other without one of the mobile phones 103 and 105 being attached as a wireless accessory to the other.

Optionally, the second mobile phone 105 can be a virtual phone provided by an emulator running in a computing device (e.g., 107).

Figure 20:
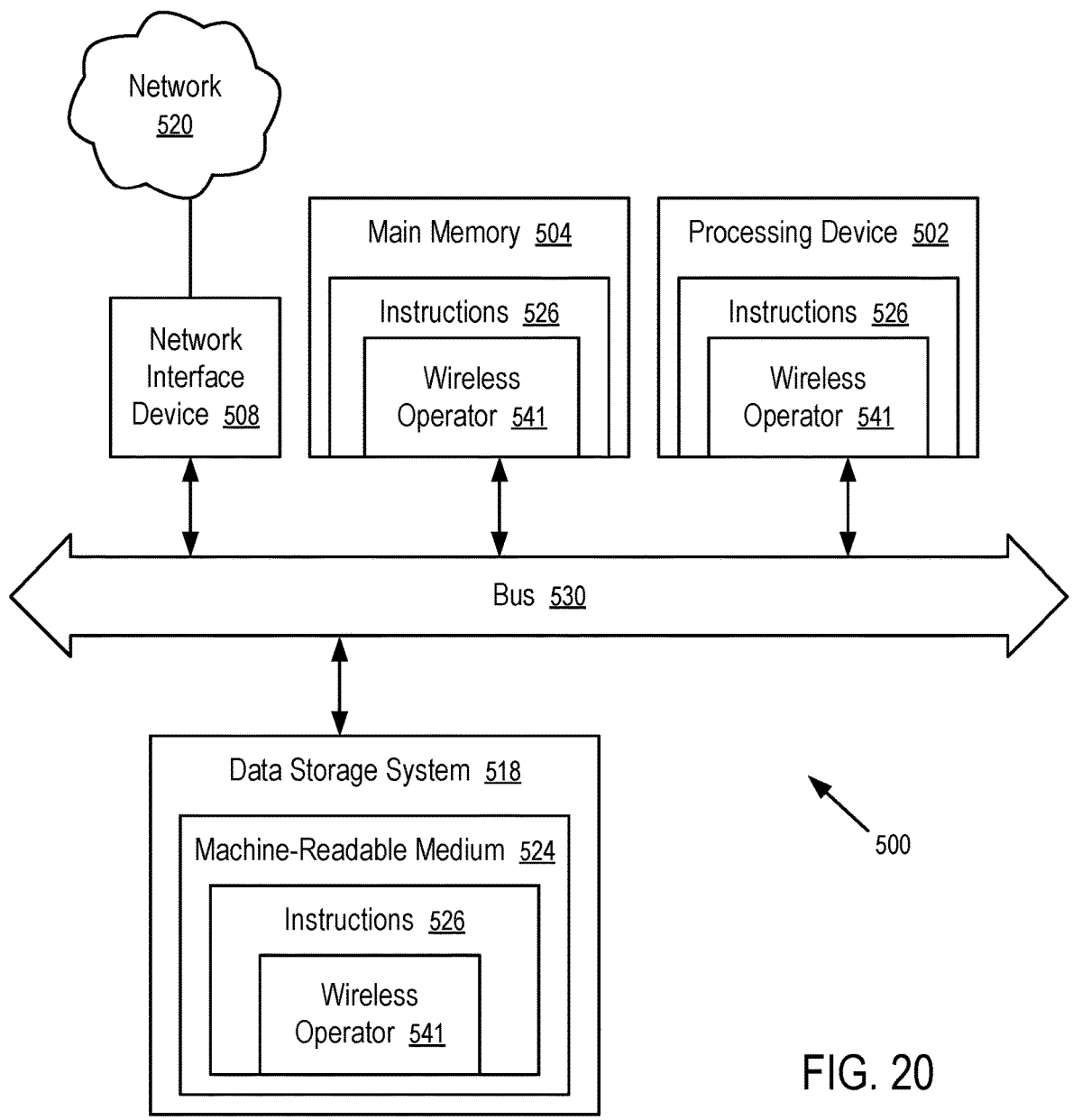
FIG. 20 a block diagram of an example computer system in which embodiments of the present disclosure can be implemented.

FIG. 20 illustrates an example machine of a computer system 500 within which a set of instructions, for causing the machine to perform any one or more of the operations discussed above, can be executed. In some embodiments, the computer system 500 can be used to perform the operations of a wireless operator 541 (e.g., to execute instructions to perform operations corresponding to the wireless accessory and/or the emulator 221 described above). In alternative embodiments, the machine can be connected (e.g., networked) to other machines in a LAN, an intranet, an extranet, and/or the internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 518, which communicate with each other via a bus 530 (which can include multiple buses).

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable medium 524, data storage system 518, and/or main memory 504 can correspond to a memory sub-system.

In one embodiment, the instructions 526 include instructions to implement functionality corresponding to a wireless operator 541 (e.g., operations of the wireless accessory and/or the emulator 221 described above). While the machine-readable medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
 detecting an indication that a distance between a first mobile phone and a second mobile phone is within a predetermined proximity radius of no greater than a meter, wherein each of the first mobile phone and the second mobile phone runs a mobile operating system, is configured with a touch screen and a plurality of wireless communications devices including a cellular communications transceiver, and has a size adapted for being carried in pockets;
 detecting a state of:
 the first mobile phone is being operated directly by a user; and
 the second mobile phone is not being operated directly by the user; and
 automatically and responsive to the indication the distance is within the predetermined proximity radius and responsive to the state that the first mobile phone is directly operated by the user while the second mobile phone is not directly operated by the user:
 attaching the first mobile phone as a wireless accessory to the second mobile phone over a wireless connection between the first mobile phone and the second mobile phone, wherein the first mobile phone is not attached as the wireless accessory to the second mobile phone when the second mobile phone is directly operated by the user;
 receiving, in the first mobile phone functioning as the wireless accessory over the wireless connection, outputs from the second mobile phone running a mobile application configured to make phone calls, capture pictures, or play music;
 presenting, in the first mobile phone functioning as the wireless accessory, the outputs generated by the mobile application running in the second mobile phone;
 receiving, in the first mobile phone functioning as the wireless accessory, user inputs to the mobile application running in the second mobile phone; and
 controlling, by the first mobile phone functioning as the wireless accessory over the wireless connection, the second mobile phone running the mobile application based on the user inputs received in the first mobile phone.

2. The method of claim 1, wherein the wireless accessory is implemented via an application or system module running in the first mobile phone.

3. The method of claim 2, wherein the wireless accessory is configured to provide a touch screen function to the second mobile phone using a touch screen of the first mobile phone.

4. The method of claim 3, wherein a touch screen of the second mobile phone remains locked or turned off while the first mobile phone is functioning as the wireless accessory to the second mobile phone over the wireless connection.

5. The method of claim 4, further comprising:
 presenting an indication identifying the second mobile phone on the touch screen of the first mobile phone while the first mobile phone is functioning as the wireless accessory to the second mobile phone over the wireless connection.

6. The method of claim 4, further comprising:
 terminating the wireless connection in response to one of:
 the distance between the first mobile phone and the second mobile phone becomes greater than the predetermined proximity radius;
 the touch screen of the second mobile phone becomes active; and
 a physical button on the second mobile phone is used.

7. The method of claim 6, wherein the indication that the distance between the first mobile phone and the second mobile phone is within the predetermined proximity radius is based on signal strength levels of wireless communications signals exchanged between antennas of the first mobile phone and the second mobile phone; and the predetermined proximity radius is smaller than a communication range of the wireless connection.

8. The method of claim 6, wherein the indication that the distance between the first mobile phone and the second mobile phone is within the predetermined proximity radius is based on a predetermined time window from when the first mobile phone and the second mobile phone are in communication via a technique of near field communication.

9. The method of claim 6, wherein the predetermined proximity radius is no greater than one meter.

10. The method of claim 2, wherein the application or system module is configured to provide a plurality of virtual wireless devices to process inputs to and outputs from the second mobile phone; the plurality of virtual wireless devices include a virtual wireless screen, a virtual wireless mouse, a virtual wireless microphone, a virtual wireless speaker, and a virtual gesture generator.

11. The method of claim 2, wherein the second mobile phone is dynamically attachable, responsive to the indication and a state that the second mobile phone is being operated directly by the user while the first mobile phone is not being operated directly by the user, as a wireless accessory to the first mobile phone over a wireless connection between the first mobile phone and the second mobile phone.

12. A mobile phone having an application or system module operable to attach the mobile phone to a computing device as a wireless accessory to the computing device over a wireless connection between the mobile phone and the computing device, based at least in part on that the mobile phone is located within a predetermined proximity radius of no greater than one meter from the computing device, and a display device of the computing device is inactive, wherein the mobile phone is not attached to the computing device as the wireless accessory when the display device of the computing device is directly operated by a user, wherein each of the mobile phone and the computing device:
 runs a mobile operating system;
 is configured with a touch screen and a plurality of wireless communications devices including a cellular communications transceiver; and
 has a size adapted for being carried in pockets;
 wherein in response to an image sensor of the mobile phone captures an image, the mobile phone is operable to offer storing the image over the wireless connection into the computing device without retaining the image in the mobile phone.

13. The mobile phone of claim 12, wherein the wireless accessory is configured to provide a touch screen function to the computing device using a touch screen of the mobile phone; and the display device of the computing device remains inactive while the mobile phone functions as the wireless accessory to the computing device over the wireless connection.

14. The mobile phone of claim 13, wherein the application or system module is configured to present an indication to identify the computing device on the touch screen of the mobile phone while the mobile phone functions as the wireless accessory to the computing device over the wireless connection.

15. The mobile phone of claim 13, configured to terminate the wireless connection in response to one of:
- a distance between the mobile phone and the computing device becomes greater than the predetermined proximity radius;
- the display device of the computing device becomes active; and
- a physical user interface element on the computing device is used.

16. The mobile phone of claim 13, wherein the application or system module is configured to provide a plurality of virtual wireless devices to process inputs and outputs of the computing device; the plurality of virtual wireless devices include a virtual wireless screen, a virtual wireless mouse, a virtual wireless microphone, a virtual wireless speaker, and a virtual gesture generator.

17. The mobile phone of claim 13, wherein the computing device is dynamically attachable, responsive to the display device of the computing device is active while the touch screen of the mobile phone is inactive, as a wireless accessory to the mobile phone over a wireless connection between the mobile phone and the computing device.

18. A non-transitory computer storage medium storing instructions which, when executed by a mobile phone, cause the mobile phone to perform a method, the method comprising:
- detecting a state in which:
  - the mobile phone is located within a predetermined proximity radius of no greater than one meter from a computing device;
  - a touch screen of the mobile phone is active; and
  - a display device of the computing device is inactive, wherein each of the mobile phone and the computing device runs a mobile operating system, is configured with a touch screen and a plurality of wireless communications devices including a cellular communications transceiver, and has a size adapted for being carried in pockets; and
- attaching, based on the state being detected, the mobile phone to the computing device as a wireless accessory to the computing device over a wireless connection between the mobile phone and the computing device to:
  - control, using volume buttons of the mobile phone, a volume level of a bluetooth audio accessory connected wirelessly to the computing device;
  - take, using the mobile phone, a phone call placed to the computing device;
  - capture, using an image sensor of the mobile phone, a photo or video clip stored into the computing device without retaining the photo or video clip in the mobile phone;
  - wherein the mobile phone is not attached as the wireless accessory to the computing device when the mobile phone and the computing device are both directly operated by a user.

19. The non-transitory computer storage medium of claim 18, wherein the wireless accessory is configured to provide a touch screen function to the computing device using the touch screen of the mobile phone; and the display device of the computing device remains inactive while the mobile phone functions as the wireless accessory to the computing device over the wireless connection.

20. The non-transitory computer storage medium of claim 19, wherein the method further comprising:
- terminating the wireless connection in response to one of:
  - a distance between the mobile phone and the computing device becomes greater than the predetermined proximity radius;
  - the display device of the computing device becomes active; and
  - a physical user interface element on the computing device is used.

* * * * *